US012799569B2

(12) United States Patent
Notoyama et al.

(10) Patent No.: US 12,799,569 B2
(45) Date of Patent: Nov. 17, 2026

(54) HYDROGEN ABSORBING ALLOY FOR ALKALINE STORAGE BATTERY

(71) Applicant: JAPAN METALS AND CHEMICALS CO., LTD., Tokyo (JP)

(72) Inventors: Saki Notoyama, Nishiokitama-gun (JP); Tomoki Souma, Nishiokitama-gun (JP); Katsuyuki Kudo, Nishiokitama-gun (JP); Ryoji Suzuki, Nishiokitama-gun (JP); Takao Sawa, Nishiokitama-gun (JP)

(73) Assignee: JAPAN METALS AND CHEMICALS CO., LTD., Tokyo (JP)

( * ) Notice: Subject to any disclaimer, the term of this patent is extended or adjusted under 35 U.S.C. 154(b) by 454 days.

(21) Appl. No.: 18/692,720

(22) PCT Filed: Jun. 22, 2022

(86) PCT No.: PCT/JP2022/024799

§ 371 (c)(1),
(2) Date: Mar. 15, 2024

(87) PCT Pub. No.: WO2023/047726

PCT Pub. Date: Mar. 30, 2023

(65) Prior Publication Data

US 2025/0137104 A1 May 1, 2025

(30) Foreign Application Priority Data

Sep. 24, 2021 (JP) ................................ 2021-155922
Jan. 14, 2022 (JP) ................................ 2022-004557

(51) Int. Cl.
*C22C 19/03* (2006.01)
*C22C 19/00* (2006.01)
(Continued)

(52) U.S. Cl.
CPC .............. *C22C 28/00* (2013.01); *C22C 19/00* (2013.01); *C22C 19/03* (2013.01); *C22F 1/00* (2013.01);
(Continued)

(58) Field of Classification Search
CPC ..... C22C 19/03; C22C 28/00; C22C 2202/04; C22F 1/00; C22F 1/10; H01M 10/24
See application file for complete search history.

(56) References Cited

U.S. PATENT DOCUMENTS

2003/0096164 A1 5/2003 Sakai et al.
2008/0299458 A1 12/2008 Yoshida et al.
(Continued)

FOREIGN PATENT DOCUMENTS

CN 101320802 A 12/2008
CN 101471440 A 7/2009
(Continued)

OTHER PUBLICATIONS

Shigekazu Yasuoka et al. "Effects of Cerium on the Hydrogen Absorption-Desorption Properties of Rare Earth-Mg-Ni Hydrogen-Absorbing Alloys". Journal of Power Sources, 2017, vol. 346, pp. 56-62.
(Continued)

*Primary Examiner* — Jessee R Roe
(74) *Attorney, Agent, or Firm* — Oliff PLC

(57) ABSTRACT

A hydrogen absorbing alloy suitable for a negative electrode of an alkaline storage battery is used for an alkaline storage battery, and this hydrogen absorbing alloy is an alloy that is composed mainly of crystal phases of an $A_5B_{19}$ phase and an $A_2B_7$ phase and is represented by the following General Formula (A):

$$(La_{1-a-b}Ce_aSm_b)_{1-c}Mg_cNi_dM_eT_f \quad (A),$$

(Continued)

where M, T, and suffixes a, b, c, d, e, and f in Formula (A) meet the following conditions: M: at least one element selected from Al, Zn, Sn, and Si; T: at least one element selected from Cr, Mo, and V; $0<a\leq0.10$; $0\leq b<0.15$; $0.08\leq c\leq0.24$; $0.03\leq e\leq0.14$; $0\leq f\leq0.05$; and $3.55\leq d+e+f\leq3.80$.

9 Claims, 3 Drawing Sheets

(51) Int. Cl.
*C22C 28/00* (2006.01)
*C22F 1/00* (2006.01)
*C22F 1/10* (2006.01)
*H01M 10/24* (2006.01)

(52) U.S. Cl.
CPC ............ *C22F 1/10* (2013.01); *C22C 2202/04* (2013.01); *H01M 10/24* (2013.01)

(56) References Cited

U.S. PATENT DOCUMENTS

| | | | |
|---|---|---|---|
| 2009/0061318 | A1 | 3/2009 | Ishida et al. |
| 2009/0111023 | A1 | 4/2009 | Kihara et al. |
| 2009/0169995 | A1 | 7/2009 | Yoshida et al. |
| 2009/0226342 | A1 | 9/2009 | Kanemoto et al. |
| 2010/0178561 | A1 | 7/2010 | Kakeya et al. |
| 2010/0323243 | A1 | 12/2010 | Yoshida et al. |
| 2011/0229755 | A1 | 9/2011 | Sugii et al. |
| 2014/0030583 | A1 | 1/2014 | Kai et al. |
| 2015/0333327 | A1 | 11/2015 | Young et al. |
| 2016/0090643 | A1 | 3/2016 | Okuda et al. |

FOREIGN PATENT DOCUMENTS

| | | | |
|---|---|---|---|
| CN | 108172817 | A | 6/2018 |
| CN | 112877567 | A | 6/2021 |
| EP | 0 892 451 | A2 | 1/1999 |
| JP | H11-323469 | A | 11/1999 |
| JP | 2005-032573 | A | 2/2005 |
| JP | 2008-300108 | A | 12/2008 |
| JP | 2009-074164 | A | 4/2009 |
| JP | 2009-108379 | A | 5/2009 |
| JP | 2009-176712 | A | 8/2009 |
| JP | 2011-021262 | A | 2/2011 |
| JP | 2011-023337 | A | 2/2011 |
| JP | 2011-082129 | A | 4/2011 |
| JP | 2011-216467 | A | 10/2011 |
| JP | 2014-026844 | A | 2/2014 |
| JP | 2014-229593 | A | 12/2014 |
| JP | 2016-069692 | A | 5/2016 |
| JP | 2017-519901 | A | 7/2017 |
| JP | 2022-052729 | A | 4/2022 |
| WO | 01/048841 | A1 | 7/2001 |
| WO | 2007/018292 | A1 | 2/2007 |
| WO | 2008/018494 | A1 | 2/2008 |

OTHER PUBLICATIONS

Lu Zhang et al. "A New AB4-TYPE Single-Phase Superlattice Compound for Electrochemical Hydrogen Storage". Journal of Power Sources, 2018, vol. 401, pp. 102-110.

Wenfeng Wang et al. "A Promising Anode Candidate for Rechargeable Nickel Metal Hydride Power Battery: an A5B19-Type La—Sm—Nd—Mg—Ni—Al-Based Hydrogen Storage Alloy". Journal of Power Sources, 2020, vol. 465, 228236, 9 pages.

Wenfeng Wang et al. "A Novel AB4-TYPE Re—Mg—Ni—Al-Based Hydrogen Storage Alloy With High Power for Nickel-Metal Hydride Batteries". Electrochimica Acta, 2019, vol. 317, pp. 211-220.

Apr. 23, 2026 Office Action issued in Chinese Patent Application No. 202280061961.6.

HYDROGEN ABSORBING ALLOY FOR ALKALINE STORAGE BATTERY

TECHNICAL FIELD

The present invention relates to a hydrogen absorbing alloy used for an alkaline storage battery.

BACKGROUND ART

In recent years, nickel-metal hydride secondary batteries, which have higher capacities than nickel-cadmium batteries and do not contain harmful substances in environmental terms, have become widely used, for example, for mobile phones, personal computers, electric tools, and hybrid electric vehicles (HEVs), and for these applications, alkaline storage batteries are mainly used.

Hydrogen absorbing alloys with an $AB_5$-type crystal structure have been conventionally used for negative electrodes of alkaline storage batteries. However, these alloys have their limits in making batteries smaller and lighter, and development of new hydrogen absorbing alloys that can achieve a small size and a high capacity has been desired. Therefore, as solutions, Patent Literature 1 and Patent Literature 2 propose rare earth-Mg-transition metal-based hydrogen absorbing alloys containing Mg.

One example of possible approaches for downsizing and weight reduction is to reduce the amount of hydrogen absorbing alloy used for the negative electrode. However, reducing the amount of hydrogen absorbing alloy raises a new problem that the output decreases due to a decrease in the number of nickel active sites. As a remedy, Patent Literature 3 proposes a technique of raising an operating voltage by using a hydrogen absorbing alloy having a high hydrogen equilibrium pressure.

Several rare earth-Mg—Ni-based alloys have been proposed as hydrogen absorbing alloys. For example, with the objective of providing a hydrogen absorbing alloy with excellent corrosion resistance and durability, and a nickel-metal hydride storage battery with an excellent cycle life that uses this hydrogen absorbing alloy, Patent Literature 4 discloses a hydrogen absorbing alloy, which, specifically, is represented by a general formula $(RE_{1-a-b}Sm_aMg_b)(Ni_{1-c-d}Al_cM_d)_x$ ($0.1 \le a \le 0.25$; $0.1<b<0.2$; $0.02<cx<0.2$; $0 \le dx \le 0.1$; $3.6 \le x \le 3.7$; RE is one or more elements selected from rare earth elements other than Sm and Y; La is essential; and M is Mn and/or Co).

Patent Literature 5 reports providing an alkaline storage battery that is inexpensive, has a favorable discharge output characteristic, and is also excellent in high-temperature durability. As one embodiment thereof, a hydrogen absorbing alloy negative electrode uses an alloy of which the general formula $(La_xLn_y)_{1-z}Mg_zNi_{t-u}T_u$ includes La as a main rare earth element (T: selected from Al, Co, Mn, and Zn, Ln being at least one element selected from rare earth elements other than La and Y, $x>y$, $0.09 \le z \le 0.14$, $3.65 \le t \le 3.80$, and $0.05 \le u \le 0.25$); which includes an $A_5B_{19}$-type structure of a hexagonal system (2H), an $A_5B_{19}$-type structure of a trigonal system (3R), and an $A_2B_7$-type structure; and in which the $A_5B_{19}$-type crystal structure of the 2H system has a higher intensity peak than the $A_5B_{19}$-type crystal structure of the 3R system and the $A_2B_7$-type structure in powder X-ray diffraction using a Cu-K$\alpha$ ray.

Patent Literature 6 discloses a hydrogen absorbing alloy characterized in that the alloy includes a phase having a $Pr_5Co_{19}$-type crystal structure of which the composition is represented by a general formula: $A_{(4-w)}B_{(1+w)}C_{19}$ (where A is one or more than one element selected from rare earth elements including Y (yttrium); B is an Mg element; C is one or more than one element selected from a group consisting of Ni, Co, Mn, and Al; and w represents a number within a range of −0.1 to 0.8), and in that the composition of the alloy as a whole is represented by a general formula: $R1_xR2_yR3_z$ (where $15.8 \le x \le 17.8$; $3.4 \le y \le 5.0$; $78.8 \le z \le 79.6$; $x+y+z=100$; R1 is one or more than one element selected from rare earth elements including Y (yttrium); R2 is Mg; R3 is one or more than one element selected from a group consisting of Ni, Co, Mn, and Al; and, of the z, a value indicating Mn+Al is 0.5 or more and a value indicating Al is 4.1 or less).

Patent Literature 7 discloses a hydrogen absorbing alloy made up of component A that is composed of rare earth elements represented by Ln and magnesium and component B that is composed of elements including at least nickel and aluminum. This hydrogen absorbing alloy is characterized in that: an alloy main phase of the hydrogen absorbing alloy has an $A_5B_{19}$-type structure; the general formula is expressed as $Ln_{1-x}Mg_xNi_{y-a-b}Al_aM_b$ (in this formula, M is at least one element selected from Co, Mn, and Zn; $0.1<x \le 0.2$; $3.6 \le y \le 3.9$; $0.1 \le a \le 0.2$; and $0 \le b \le 0.1$); the rare earth elements (Ln) are composed of up to two elements including at least lanthanum (La); and an absorbed hydrogen equilibrium pressure (Pa) when a hydrogen absorbing capacity H/M (atomic ratio) at 40° C. is 0.5 is 0.03 to 0.17 MPa.

Further, Patent Literature 8 discloses a hydrogen absorbing alloy represented by a general formula: $Ln_{1-x}Mg_xNi_yA_z$ (in this formula, Ln is at least one element selected from rare earth elements including Y and Ca, Zr, and Ti; A is at least one element selected from Co, Mn, V, Cr, Nb, Al, Ga, Zn, Sn, Cu, Si, P, and B; and suffixes x, y, and z meet the conditions of $0.05 \le x \le 0.25$, $0<z \le 1.5$, and $2.8 \le y+z \le 4.0$). In this hydrogen absorbing alloy, Ln includes 20 mol % or more Sm.

Further, Patent Literature 9 discloses, as a hydrogen absorbing alloy with excellent alkali resistance, a hydrogen absorbing alloy having a composition expressed by a general formula: $(La_aSm_bA_c)_{1-w}Mg_wNi_xAl_yT_z$ (in this formula, A and T represent at least one element selected from a group consisting of Pr, Nd, etc. and a group consisting of V, Nb, etc., respectively; suffixes a, b, and c meet relationships expressed by $a>0$, $b>0$, $0.1>c \ge 0$, and $a+b+c=1$; and suffixes w, x, y, and z are within ranges expressed by $0.1<w \le 1$, $0.05 \le y \le 0.35$, $0 \le z \le 0.5$, and $3.2 \le x+y+z \le 3.8$).

Patent Literature 10 reports, by studying a component ratio between an $A_2B_7$ structure and an $A_5B_{19}$ structure, providing a hydrogen absorbing alloy for an alkaline storage battery that can have a high output characteristic far beyond a conventional range, a manufacturing method thereof, and an alkaline storage battery. Specifically, the disclosed hydrogen absorbing alloy for an alkaline storage battery is characterized in that: the alloy contains an element R selected from rare earth elements excluding La and including Y and Group 4 element, and an element M composed of at least one or more selected from Co, Mn, and Zn; the general formula is expressed as $La_\alpha R_{1-\alpha-\beta}Mg_\beta Ni_{\gamma-\eta-\varepsilon}Al_\eta M_\varepsilon$ (α, β, γ, η, and ε meet $0 \le a \le 0.5$, $0.1 \le \beta \le 0.2$, $3.7 \le \gamma \le 3.9$, $0.1 \le \eta \le 0.3$, and $0 \le \varepsilon \le 0.2$); and the $A_5B_{19}$-type structure accounts for 40% or more of the crystal structure.

Patent Literature 11 provides a hydrogen absorbing alloy for an alkaline storage battery that is excellent in high output characteristic and output stability, and a manufacturing method thereof. Specifically, it is disclosed that: the hydrogen absorbing alloy for an alkaline storage battery is represented by $AB_n$ (A: $La_xRe_yMg_{1-x-y}$, B: $Ni_{n-z}T_z$, Re: at least one element selected from rare earth elements including Y (excluding La), T: at least one element selected from Co, Mn, Zn, and Al, and z>0); a stoichiometric ratio n is 3.5 to 3.8; a ratio of La to Re (x/y) is 3.5 or less; the alloy has at least an $A_5B_{19}$-type structure; and an average C-axis length a of a crystal lattice is 30 to 41 Å.

Patent Literature 12 aims to provide a hydrogen absorbing alloy that allows a nickel-metal hydride storage battery to have an excellent cycle characteristic, etc. Specifically, a hydrogen absorbing alloy represented by a general formula $La_vSm_wM1_xM2_yM3_z$ is disclosed. This alloy is characterized in that: M1 is elements that are Pr and/or Nd; M2 is elements including, of Mg and Ca, at least Mg; M3 is Ni, or Ni partially substituted with one or more than one element selected from a group consisting of Group 6A elements, Group 7A elements, Group 8 elements (excluding Ni and Pd), Group 1B elements, Group 2B elements, and Group 3B elements; and v, w, x, y, and z meet the following Formula (1), Formula (2), and Formula (3):

$$3.2 \le z/(v+w+x+y) \le 3.7 \quad \text{Formula (1)}$$

$$0.60 \le v/(v+w+x) \le 0.85 \quad \text{Formula (2)}$$

$$0.01 \le w/(v+w+x) \le 0.06 \quad \text{Formula (3)}$$

Patent Literature 13 discloses a hydrogen absorbing alloy for an alkaline storage battery characterized in that: the composition formula is expressed as $La_xRe_yMg_{1-x-y}Ni_{n-m-v}Al_mT_v$ (where Re is at least one element selected from rare earth elements including Y (excluding La); T is at least one element selected from Co, Mn, Zn, Fe, Pb, Cu, Sn, Si, and B; $0.17 \le x \le 0.64$; $3.5 \le n \le 3.8$; $0.10 \le m+v \le 0.22$; and $v \ge 0$); the main phase has an $A_5B_{19}$-type structure; and a ratio X/Y between a concentration ratio X (Al/Ni) (%) of aluminum (Al) to nickel (Ni) in a surface layer and a concentration ratio Y (Al/Ni) (%) of aluminum (Al) to nickel (Ni) in a bulk layer is between 0.36 and 0.84, inclusive ($0.36 \le X/Y \le 0.84$).

Patent Literature 14 discloses a hydrogen absorbing alloy for an alkaline storage battery of which the composition formula is expressed as $La_xRe_yMg_{1-x-y}Ni_{n-m-v}Al_mT_v$ (where Re is at least one element selected from rare earth elements including Y (excluding La); T is at least one element selected from Co, Mn, and Zn; $0.17 \le x \le 0.64$; $3.5 \le n \le 3.8$; $0.06 \le m \le 0.22$; and $v \ge 0$), and a crystal structure of a main phase is an $A_5B_{19}$-type structure, and in which a ratio X/Y between a concentration ratio X (Al/Ni) (%) of aluminum (Al) to nickel (Ni) in a surface layer and a concentration ratio Y (Al/Ni) (%) of aluminum (Al) to nickel (Ni) in a bulk layer is between 0.36 and 0.85, inclusive ($0.36 \le X/Y \le 0.85$).

Patent Literature 15 discloses a nickel-metal hydride secondary battery including a hydrogen absorbing alloy in a negative electrode of the nickel-metal hydride secondary battery. This hydrogen absorbing alloy has a composition represented by a general formula: $(RE_{1-x}T_x)_{1-y}Mg_yNi_{z-a}Al_a$ (in this formula, RE is at least one element selected from Y, Sc, and rare earth elements; T is at least one element selected from Zr, V, and Ca; and suffixes x, y, z, and a are expressed as $0 \le x$, $0.05 \le y \le 0.35$, $2.8 \le z \le 3.9$, and $0.10 \le a \le 0.25$, respectively), and has a crystal structure in which $AB_2$-type subunits and $AB_5$-type subunits are stacked, with the Ni partially substituted with Cr.

Meanwhile, Non Patent Literature 1 devotes a chapter to an influence of Ce on an RE-Mg—Ni-based hydrogen absorbing alloy (RE: rare earth elements). In this chapter, the following alloys are disclosed and a result of evaluating them is reported:

$(La_{0.5}Nd_{0.5})_{0.85}Mg_{0.15}Ni_{3.3}Al_{0.2}$ $(La_{0.45}Nd_{0.45}Ce_{0.1})_{0.85}Mg_{0.15}Ni_{3.3}Al_{0.2}$ $(La_{0.4}Nd_{0.4}Ce_{0.2})_{0.85}Mg_{0.15}Ni_{3.3}Al_{0.2}$ $(La_{0.3}Nd_{0.3}Ce_{0.4})_{0.85}Mg_{0.15}Ni_{3.3}Al_{0.2}$

Non Patent Literature 2 reports characteristics of a hydrogen absorbing alloy consisting of $La_{0.78}Mg_{0.22}Ni_{3.67}Al_{0.10}$.

Further, Non Patent Literature 3 reports a hydrogen absorbing alloy consisting of $La_{0.64}Sm_{0.07}Nd_{0.08}Mg_{0.21}Ni_{3.57}Al_{0.10}$ that has been heat-treated at 995° C. for 24 hours.

In addition, Non Patent Literature 4 reports characteristics of an alloy composition consisting of $La_{0.63}Nd_{0.16}Mg_{0.21}Ni_{3.53}Al_{0.11}$.

CITATION LIST

Patent Literature

Patent Literature 1: Japanese Patent Laid-Open No. 11-323469

Patent Literature 2: International Publication No. WO 01/48841

Patent Literature 3: Japanese Patent Laid-Open No. 2005-32573

Patent Literature 4: Japanese Patent Laid-Open No. 2016-69692

Patent Literature 5: Japanese Patent Laid-Open No. 2014-229593

Patent Literature 6: International Publication No. WO 2007/018292

Patent Literature 7: Japanese Patent Laid-Open No. 2009-176712

Patent Literature 8: Japanese Patent Laid-Open No. 2009-74164

Patent Literature 9: Japanese Patent Laid-Open No. 2009-108379

Patent Literature 10: Japanese Patent Laid-Open No. 2008-300108

Patent Literature 11: Japanese Patent Laid-Open No. 2011-023337

Patent Literature 12: Japanese Patent Laid-Open No. 2011-21262

Patent Literature 13: Japanese Patent Laid-Open No. 2011-82129

Patent Literature 14: Japanese Patent Laid-Open No. 2011-216467

Patent Literature 15: Japanese Patent Laid-Open No. 2014-26844

Non Patent Literature

Non Patent Literature 1: S. Yasuoka et al., J. Power Sources 346 p. 56 (2017)

Non Patent Literature 2: L. Zhang et al., J. Power Sources 401 p. 102 (2018)

Non Patent Literature 3: W. Wang et al., J. Power Sources 465 228236 (2020)

Non Patent Literature 4: W. Wang et al., Electrochimica Acta 317 211 (2019)

SUMMARY OF INVENTION

Technical Problem

However, the technologies disclosed in Patent Literature 1 and Patent Literature 2 described above have failed to optimize the alloys enough to be put to practical use for various applications.

In the technology disclosed in Patent Literature 3, using a hydrogen absorbing alloy having a high hydrogen equilibrium pressure leads to a new problem that the charge-discharge cycle life decreases.

Although the hydrogen absorbing alloy disclosed in Patent Literature 4 is improved in the cycle characteristic, putting this alloy to practical use requires further improvement in the cycle characteristic as well as improvement in the discharge capacity and especially the rate characteristic.

While in the technology disclosed in Patent Literature 5 an appropriate composition of the crystal phases is indicated by X-ray diffraction intensity, the hydrogen equilibrium pressure (a dissociation pressure when the hydrogen absorbing capacity (H/M) at 40° C. is 0.5) is so high that problems can arise when the alloy is used for a battery.

In the case of the technology disclosed in Patent Literature 6, which aims to reconcile a high capacity and a long-cycle-life characteristic, evaluations are determined based on up to a few tens of cycles, and thus the actual life has failed to be evaluated.

Further, in the technology disclosed in Patent Literature 7, as with Patent Literature 5, the hydrogen equilibrium pressure (the dissociation pressure when the hydrogen absorbing capacity (H/M) at 40° C. is 0.5) of the hydrogen absorbing alloy is so high that problems can arise when the alloy is used for a battery. Another problem is that the material cost is high.

In the technology disclosed in Patent Literature 8, the alloy contains a comparatively large amount of Sm and thus a less expensive element than Pr and Nd is used. Nevertheless, the material cost is still high, and besides, a favorable rate characteristic has not been obtained, so that an adequate hydrogen absorbing alloy cannot be provided.

In the technology disclosed in Patent Literature 9, the alloy contains comparatively large amounts of La and Sm and thus less expensive elements than Pr and Nd are mainly used. Nevertheless, a hydrogen absorbing alloy that is inexpensive and has excellent durability cannot yet be provided. Moreover, the rate characteristic need be improved. In particular, examples of implementation merely disclose that Zr is essential and that a B/A ratio is 3.6. While it is mentioned that the hydrogen equilibrium pressure that has been reduced as a result of increasing the content of La is raised to such a level that the alloy becomes usable for a battery, setting a composition rich in inexpensive La is often inadequate.

While the technology disclosed in Patent Literature 10 shows improvement in the output at low temperatures, the intrinsic high capacity and cycle life characteristic are not sufficient. Moreover, La is excluded from the rare earth elements of the alloy, and alloys including large amounts of Nd are costly.

While the technology disclosed in Patent Literature 11 aims at a high output characteristic and output stability, it fails to achieve a satisfactory intrinsic high capacity and cycle life characteristic. Moreover, the alloy is comparatively costly with a comparatively low content of La among the rare earth elements, and an inexpensive alloy that can be put to practical use is desired.

The technology disclosed in Patent Literature 12 is intended to improve the cycle characteristic and focuses on the performance of absorbing an oxygen gas generated in a battery during use of the battery. However, a further increase in the capacity and further improvement in the cycle characteristic are desired. Another big problem is that the materials are costly.

The technology disclosed in Patent Literature 13 involves controlling the ratio of the Al concentration in the surface of the alloy to that in the inside thereof through a surface treatment to thereby improve the battery output characteristic and the output stability. However, the fundamental cycle life characteristic needs to be further improved, as well as the rate characteristic needs to be improved. Another problem is that the material cost is comparatively high.

The technology disclosed in Patent Literature 14 involves adjusting the Al/Ni ratio in the surface of the alloy to a predetermined range compared with that in the inside of the alloy through a surface treatment to thereby stabilize the battery output. However, the fundamental cycle characteristic needs to be improved. Another problem is that the material cost is comparatively high.

The technology disclosed in Patent Literature 15 is intended to reduce the self-discharge and improve the cycle life characteristic. However, the rate characteristic has failed to be improved and the capacity needs to be further increased, and characteristics improvements in these respects are desired. Another problem is that the material cost is high.

Meanwhile, Non Patent Literature 1 concludes that it has been revealed that a rare earth-Mg—Ni-based alloy containing Ce undergoes significant deterioration in a battery as it has a low capacity for hydrogen absorption and desorption and further pulverizes easily through repeated hydrogen absorption and desorption.

In Non Patent Literature 2, while a high discharge capacity is obtained, the capacity after 200 cycles has decreased by about 20%, and thus putting the alloy to practical use requires characteristics improvements.

Further, in Non Patent Literature 3, a high discharge capacity of 370 mAh/g is obtained. However, expensive Nd is contained in a certain amount, and the discharge capacity after 200 cycles has decreased by about 20%. In addition, the rate characteristic is not sufficient. Thus, the alloy needs to be further improved in characteristics to be put to practical use.

Furthermore, in Non Patent Literature 4, while a high discharge capacity is obtained, the discharge capacity after 200 cycles has decreased by about 20%, and thus the alloy needs to be further improved in characteristics to be put to practical use.

As a rare earth-Mg—Ni-based hydrogen absorbing alloy repeatedly absorbs and desorbs hydrogen, cracking occurs in the alloy and pulverization progresses, and at the same time new surfaces form. Therefore, if the corrosion resistance of the alloy is low, the alloy surfaces react to form rare-earth hydroxides. Then, an electrolytic solution is consumed, so that the inner resistance of the battery rises and the discharge capacity decreases, leading to a shorter battery life. On the other hand, a larger amount of Ni present in the alloy surfaces is more preferable for increasing the efficiency of receiving hydrogen, and it depends on the balance among various battery characteristics.

Having been devised in view of these problems faced in the related art, the present invention aims to provide a hydrogen absorbing alloy for an alkaline storage battery to be put to practical use that is an inexpensive rare earth-Mg—Ni-based alloy, with a balance achieved among the discharge capacity, the cycle life, and the rate characteristic that are important characteristics for a battery.

Solution to Problem

It was found that using an alloy that was composed mainly of crystal phases of an $A_5B_{19}$ phase and an $A_2B_7$ phase and had an ingredient composition including inexpensive Ce as a hydrogen absorbing alloy for a negative electrode of an alkaline storage battery to achieve the above-described aim could reconcile the discharge capacity characteristic, the charge-discharge cycle life characteristic, and the rate characteristic in a balanced manner, which led to the completion of the present invention.

Specifically, a hydrogen absorbing alloy of the present invention is characterized in that the hydrogen absorbing alloy is composed mainly of the two crystal phases of an $A_5B_{19}$ phase and an $A_2B_7$ phase, particularly a $Pr_5Co_{19}$ type, $Ce_5Co_{19}$ type, $Ce_2Ni_7$ type, and $Gd_2Co_7$ type, and has an ingredient composition represented by the following General Formula (A):

$$(La_{1-a-b}Ce_aSm_b)_{1-c}Mg_cNi_dM_eT_f \quad (A),$$

where M, T, and suffixes a, b, c, d, e, and f in Formula (A) meet the following conditions:

M: at least one element selected from Al, Zn, Sn, and Si;

T: at least one element selected from Cr, Mo, and V;

$$0 < a \le 0.10;$$

$$0 \le b < 0.15;$$

$$0.08 \le c \le 0.24;$$

$$0.03 \le e \le 0.14;$$

$$0 \le f \le 0.05; \text{ and}$$

$$3.55 \le d + e + f \le 3.80.$$

In the hydrogen absorbing alloy for an alkaline storage battery according to the present invention, the following, for example, could be more preferable solutions to the problems:

(a) that in General Formula (A), the following conditions are further met: $0.08 \le c \le 0.18$ and $3.70 \le d+e+f \le 3.80$;

(b) that in General Formula (A), the following conditions are further met: M being Al, $0 < a \le 0.08$, $0 \le b \le 0.08$, $0.14 \le c \le 0.24$, and $0.03 \le e < 0.10$;

(c) that in hydrogen absorption-desorption characteristics, a hydrogen pressure (P0.5) when a hydrogen absorbing capacity (H/M) during hydrogen desorption at 80° C. is 0.5 is between 0.02 MPa and 0.1 MPa, inclusive, with the hydrogen absorbing capacity (H/M) here being a ratio between the numbers of atoms of hydrogen atoms (H) and metal atoms (M);

(d) that in hydrogen absorption-desorption characteristics, a plateau slope during desorption after absorption of hydrogen is within a range that meets Formula (B) below;

(e) that the hydrogen absorbing alloy has a volume mean grain size MV of 75 μm or larger when the hydrogen absorbing alloy with a granularity adjusted to be within a range of 150 μm to 1 mm, both inclusive, has repeatedly absorbed and desorbed hydrogen, and has a hydrogen absorbing capacity (H/M; H is the number of hydrogen atoms, M is the number of metal atoms) of 0.92 or more when a hydrogen pressure is applied up to 1 MPa at 80° C., the volume mean grain size MV here being measured after the following process is repeated five times: for hydrogen absorption, applying a hydrogen pressure up to 3 MPa at 80° C. and holding it thereto for one hour, and for hydrogen desorption, performing vacuum evacuation to reduce the pressure to 0.01 MPa at 80° C. and holding it thereto for one hour;

(f) that the hydrogen absorbing alloy has a saturation magnetization of 60 $emu/m^2$ or less as measured by immersing the hydrogen absorbing alloy in a 7.15 mol/L aqueous potassium hydroxide solution at 80° C. for eight hours and then applying a magnetic field of 10 kOe at 25° C.;

(g) that a ratio of a sum (β) of diffraction intensities of a (107) plane based on a 2H structure and a (1010) plane based on a 3R structure of the $A_2B_7$ phase to a sum (α) of diffraction intensities of a (109) plane based on a 2H structure and a (1013) plane based on a 3R structure of the $A_5B_{19}$ phase in an X-ray diffraction measurement using a Cu-Kα ray as an X-ray source meets $\beta/\alpha \le 1$;

(h) that a ratio of a diffraction intensity (ζ) of a (101) plane of an $AB_5$ phase to a diffraction intensity (ε) of a strongest diffraction peak in a range of a diffraction angle 2θ of 40 to 45° in an X-ray diffraction measurement using a Cu-Kα ray as an X-ray source meets $\zeta/\varepsilon \le 0.08$, $$0.90 \le \log[(P0.7/P0.3)/0.4] \le 3.00 \quad (B)$$

where P0.7 represents a hydrogen pressure [MPa] when a hydrogen absorbing capacity (H/M)=0.7, and P0.3 represents a hydrogen pressure [MPa] when the hydrogen absorbing capacity (H/M)=0.3.

Advantageous Effects of Invention

The hydrogen absorbing alloy for an alkaline storage battery of the present invention is excellent in the discharge capacity, the cycle life, and the rate characteristic, and a nickel-metal hydride secondary battery using this hydrogen absorbing alloy has high output density as well as an excellent charge-discharge cycle life and thus has an excellent discharge capacity characteristic, which makes it usable for various applications, including consumer applications, industrial applications, and automobile applications.

DESCRIPTION OF EMBODIMENTS

Figure 1:
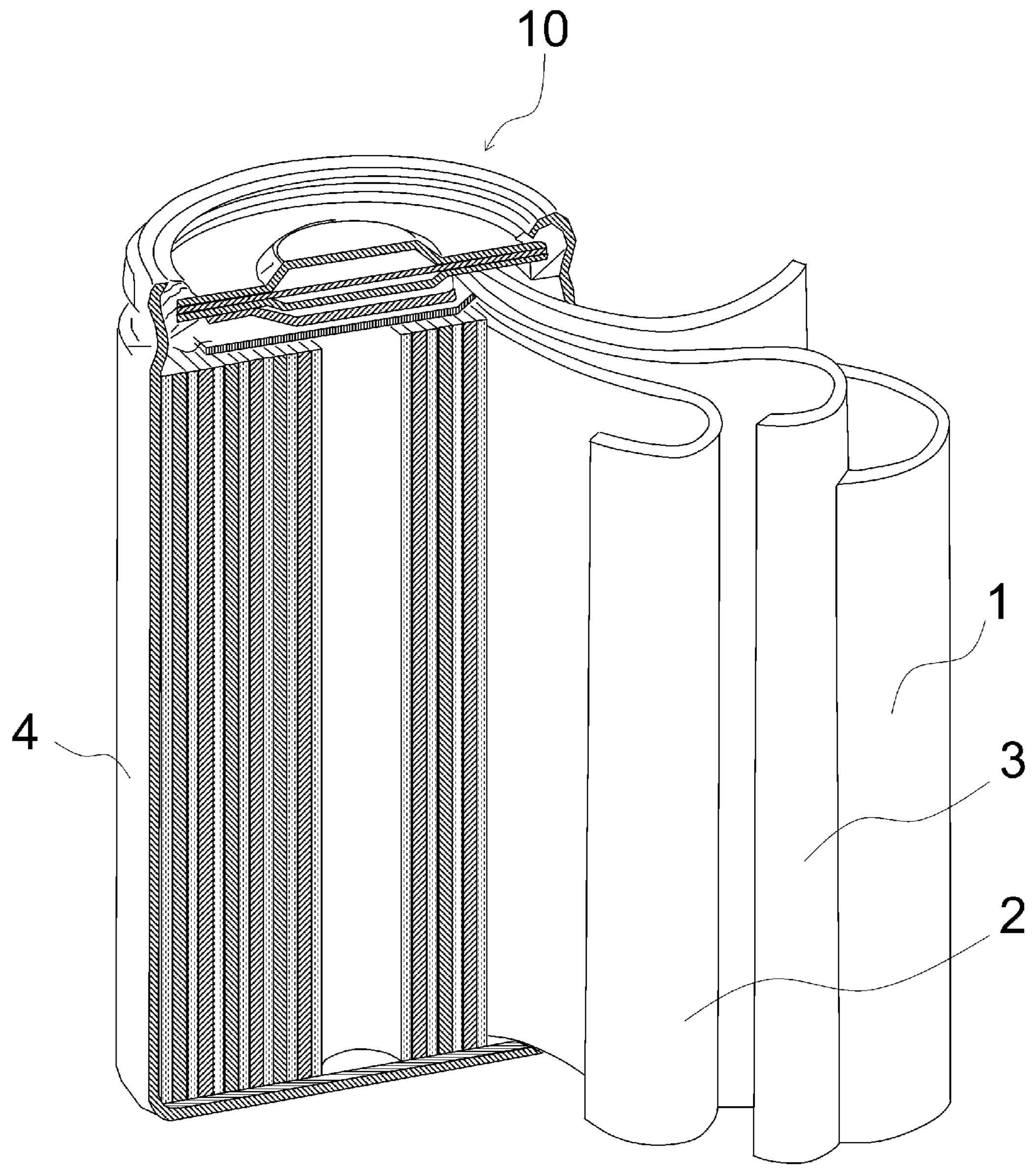
FIG. 1 is a partially cutaway perspective view showing an alkaline storage battery using a hydrogen absorbing alloy of the present invention.

An alkaline storage battery using a hydrogen absorbing alloy of the present invention will be described based on FIG. 1 that is a partially cutaway perspective view showing one example of the battery. An alkaline storage battery 10 is a storage battery including a group of electrodes consisting of a nickel positive electrode 1 that uses nickel hydroxide ($Ni(OH)_2$) as a main positive-electrode active material, a hydrogen absorbing alloy negative electrode 2 that uses a hydrogen absorbing alloy (MH) according to the present invention as a negative-electrode active material, and a separator 3. This group of electrodes is housed inside a casing 4 along with an electrolyte layer (not shown) filled with an alkaline electrolytic solution.

This battery 10 is classified as a so-called nickel-metal hydride battery (Ni-MH battery), and undergoes the following reactions.

$$\text{Positive electrode: } NiOOH + H_2O + e^- = Ni(OH)_2 + OH^-$$

$$\text{Negative electrode: } MH + OH^- = M + H_2O + e^-$$

First Embodiment

[Hydrogen Absorbing Alloy]

A hydrogen absorbing alloy used for a negative electrode of an alkaline storage battery according to a first embodiment will be described below.

The hydrogen absorbing alloy of this embodiment is required to be composed mainly of the crystal phases of an $A_5B_{19}$ phase and an $A_2B_7$ phase, particularly a $Pr_5Co_{19}$ type, $Ce_5Co_{19}$ type, $Ce_2Ni_7$ type, and $Gd_2Co_7$ type, and have an ingredient composition represented by the following General Formula (A):

$$(La_{1-a-b}Ce_aSm_b)_{1-c}Mg_cNi_dM_eT_f \quad (A),$$

where M, T, and suffixes a, b, c, d, e, and f in Formula (A) meet the following conditions:

M: at least one element selected from Al, Zn, Sn, and Si;

T: at least one element selected from Cr, Mo, and V;

$$0 < a \le 0.10;$$

$$0 \le b < 0.15;$$

$$0.08 \le c \le 0.24;$$

$$0.03 \le e \le 0.14;$$

$$0 \le f \le 0.05; \text{ and}$$

$$3.55 \le d + e + f \le 3.80.$$

When used as a negative electrode of an alkaline storage battery, this alloy represented by General Formula (A) imparts a high discharge capacity, an excellent cycle life, and a high rate characteristic to the battery, and thus contributes to achieving downsizing, weight reduction, and durability enhancement of the alkaline storage battery.

In the following, reasons for restricting the ingredient composition of the hydrogen absorbing alloy of this embodiment will be described.

Rare earth elements: $La_{1-a-b}Ce_aSm_b$ (where $0<a\le0.10$, $0\le b<0.15$)

The hydrogen absorbing alloy of this embodiment contains rare earth elements as elements of component A of the alloy composed mainly of the $A_5B_{19}$ phase and the $A_2B_7$ phase. As the rare earth elements, the two elements of La and Ce are essential as basic components that provide a hydrogen absorption capability. As La and Ce are different in atomic radius, through a component ratio between these elements, a hydrogen equilibrium pressure can be controlled and an equilibrium pressure required for the battery can be arbitrarily set. The value a that is the atomic ratio of Ce among the rare earth elements need be within a range of larger than 0 but not larger than 0.10. When the value a exceeds 0.10, cracking accompanying hydrogen absorption and desorption is promoted, which leads to a shorter cycle life. On the other hand, when the value a is 0, i.e., no Ce is contained, sufficiently controlling the hydrogen equilibrium pressure becomes difficult and the battery characteristics are adversely affected. When the value a is within the aforementioned range, a hydrogen equilibrium pressure suitable to the battery can be easily set. The value a of the atomic ratio of Ce is preferably 0.005 or more but preferably 0.08 or less. A further preferable upper limit value is 0.07.

As a rare earth element other than La and Ce, Sm can be optionally contained. Like La and Ce, Sm is an element that occupies a rare earth site as an element of component A of the alloy composed mainly of the $A_5B_{19}$ phase and the $A_2B_7$ phase, and like these elements, is a component that provides a hydrogen absorption capability. Sm is less effective in raising the equilibrium pressure than Ce but improves durability by substituting with La together with Ce. An upper limit of the value b representing the atomic ratio of Sm among the rare earth elements is less than 0.15, and when the value b is 0.15 or more, the cycle life characteristic degrades due to a balance with the amount of Ce. The upper limit is preferably $b\le0.12$.

When the composition includes a large amount of La, the discharge capacity becomes high, and the discharge capacity characteristic further improves when other elements are combined. While Pr and Nd as rare earth elements are not actively used, these elements may be contained at a level of unavoidable impurities.

Mg: $Mg_c$ (where $0.08\le c\le0.24$)

Mg is an essential element in this embodiment that constitutes an element of component A of the alloy composed mainly of crystal phases of the $A_5B_{19}$ phase and the $A_2B_7$ phase, and contributes to improving the discharge capacity and improving the cycle life characteristic. The value c representing the atomic ratio of Mg in component A should be within a range of 0.08 to 0.24, both inclusive. When the value c is less than 0.08, the hydrogen desorption capability degrades, so that the discharge capacity decreases. On the other hand, when 0.24 is exceeded, especially cracking accompanying hydrogen absorption and desorption is promoted, so that the cycle life characteristic, i.e., the durability degrades. The value c is preferably within a range of 0.09 to 0.235, both inclusive.

Ni: $Ni_d$

Ni is a main element of component B of the alloy composed mainly of crystal phases of the $A_5B_{19}$ phase and the $A_2B_7$ phase. The value d of the atomic ratio of Ni will be described later.

M: $M_e$ (0.03≤e≤0.14)

M is at least one element selected from Al, Zn, Sn, and Si, and is an element that is contained as an element of component B of the alloy composed mainly of the $A_5B_{19}$ phase and the $A_2B_7$ phase. M is effective in adjusting the hydrogen equilibrium pressure relating to the battery voltage, as well as can improve corrosion resistance. M has an improving effect on the durability, i.e., the cycle life characteristic of fine-grained hydrogen absorbing alloys. Especially Al is preferable. To reliably exert these effects, the value e representing the atomic ratio of M to component A should be within a range of 0.03 to 0.14, both inclusive. When the value e is less than 0.03, the corrosion resistance becomes insufficient, resulting in an insufficient cycle life. On the other hand, when the value e exceeds 0.14, the discharge capacity decreases. A preferable value e is between 0.04 and 0.12, inclusive. A further preferable upper limit value is 0.095.

T: $T_f$ (where 0≤f≤0.05)

T is at least one element selected from Cr, Mo, and V, and is, like the element M, an element that is contained as an element of component B of the alloy composed of the $A_5B_{19}$ phase and the $A_2B_7$ phase. Containing T is effective in adjusting the hydrogen equilibrium pressure relating to the battery voltage, and T together with the element M produces a synergy effect of enhancing the corrosion resistance and improving the durability. In particular, T has an improving effect on the durability, i.e., the cycle life characteristic of fine-grained hydrogen absorbing alloys. To reliably exert these effects, the value f representing the atomic ratio of T to component A should be 0.05 or less. When the value f exceeds 0.05, cracking accompanying hydrogen absorption and desorption is induced due to the excessive amount of the element T, resulting in lower durability and an insufficient cycle life. A preferable value f is within a range of 0.002 to 0.04, both inclusive. Among the elements of T, especially Cr is preferable from the viewpoint of durability.

Ratio Between Component A and Component B: 3.55≤d+e+f≤3.80

It is preferable that a stoichiometric ratio of component B (Ni, M, and T) to component A of the alloy composed of the $A_5B_{19}$ phase and the $A_2B_7$ phase, i.e., the value d+e+f indicated in the general formula be within a range of 3.55 to 3.80, both inclusive. When this value is less than 3.55, the rate characteristic degrades gradually. On the other hand, when 3.80 is exceeded, the $AB_5$ phase increases by a considerable amount, so that a decrease in the discharge capacity occurs gradually as well as cracking accompanying hydrogen absorption and desorption is promoted, resulting in a decrease in durability, i.e., cycle life. The value d+e+f is preferably between 3.56 and 3.79, inclusive.

Figure 2:
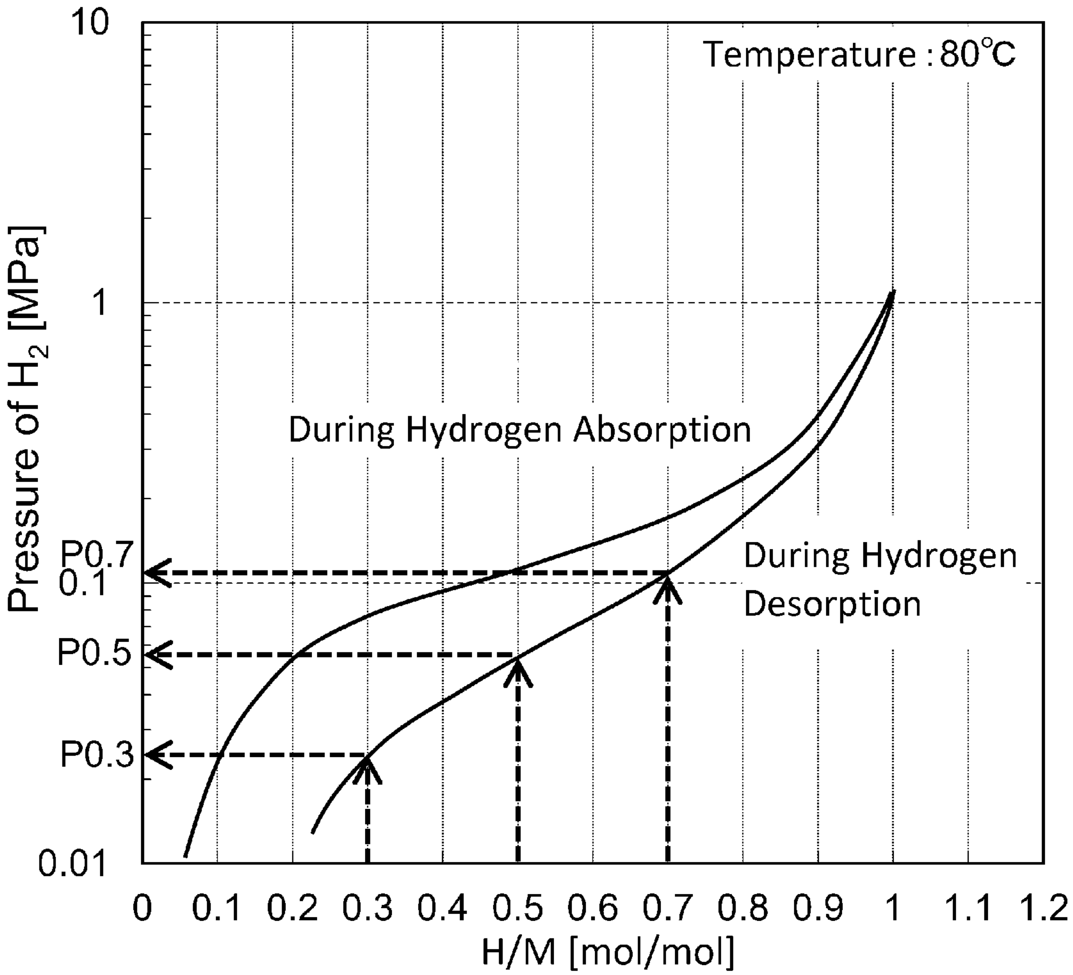
FIG. 2 is a graph showing one example of hydrogen absorption-desorption characteristics (PCT characteristics) of the hydrogen absorbing alloy according to the present invention as a relationship between a hydrogen absorbing capacity H/M and a hydrogen pressure for describing a hydrogen equilibrium pressure P0.5, and P0.7 and P0.3 for obtaining a plateau slope.

In the hydrogen absorbing alloy of this embodiment, it is preferable that a hydrogen pressure when a hydrogen absorbing capacity (H/M: a ratio between the numbers of atoms of hydrogen atoms (H) and metal atoms (M)) during hydrogen desorption at 80° C. is 0.5 (P0.5; hereinafter referred to as a hydrogen equilibrium pressure) be between 0.02 MPa and 0.1 MPa, inclusive. When the hydrogen equilibrium pressure is within this range, the battery can operate without problems under various temperature conditions. P0.5 is preferably between 0.025 MPa and 0.09 MPa, inclusive. A specific example of the hydrogen equilibrium pressure is shown in FIG. 2.

It is preferable that in hydrogen absorption-desorption characteristics of the hydrogen absorbing alloy of this embodiment, the hydrogen absorbing capacity (H/M; H is the number of hydrogen atoms, M is the number of metal atoms) when hydrogen is pressurized to 1 MPa at 80° C. be 0.92 or more. As shown in FIG. 2, a plateau slope during desorption after absorption of hydrogen was calculated based on a hydrogen pressure P0.3 (MPa) of when the hydrogen absorbing capacity H/M=0.3 and a hydrogen pressure P0.7 (MPa) of when H/M=0.7. Specifically, it is preferable that a value calculated by log [(P0.7/P0.3)/0.4]=(B1) be between 0.90 and 3.00, inclusive. When the plateau slope is less than 0.90, expansion of a lattice during hydrogen absorption is likely to occur in one direction, in other words, stretching and contraction are likely to occur anisotropically, so that cracking may be promoted due to the resulting strain. On the other hand, when the plateau slope exceeds 3.00, applying a hydrogen pressure leads to a smaller increase in the hydrogen absorbing capacity, which may result in a decrease in discharge capacity of the battery. The value of B1 is preferably between 0.92 and 2.98, inclusive.

In improving the characteristics of a nickel-metal hydride battery, the discharge capacity is largely determined by the alloy composition. On the other hand, the durability depends on a degree of pulverization of the alloy accompanying hydrogen absorption and desorption, elution of the alloy components into an alkaline aqueous solution, etc. These factors depend on a ratio of an alloy phase generated based on the alloy composition and a heat treatment, and the properties of the alloy phase. The present inventors vigorously conducted studies in pursuing the development of a hydrogen absorbing alloy that met a demand for high durability. To evaluate the crackability of an alloy due to repeated hydrogen absorption and desorption, using an alloy sifted to a size of 150 μm to 1 mm, hydrogen was absorbed by pressurizing the hydrogen up to 3 MPa at 80° C. and then the hydrogen was desorbed by vacuum evacuation. A granularity distribution after this process was repeated five times was evaluated, and a volume mean grain size (MV) was indicated as a representative value. In this way, a hydrogen absorbing alloy excellent in especially durability was found. Detailed conditions are as follows. Here, "sifted to a size of 150 μm to 1 mm" means remaining on a sieve with 150 μm openings and passing through a sieve with 1 mm openings.

Specifically, 7 g of the hydrogen absorbing alloy is packed into a measurement holder of a pressure-composition-temperature (PCT) evaluation device, and vacuum evacuation (0.01 MPa or less) is performed at 80° C. for one hour. Then, while the temperature is kept, a hydrogen absorption and desorption measurement (PCT characteristics evaluation) is performed across a range of the hydrogen pressure of 0.01 to 3 MPa. Thereafter, vacuum evacuation (0.01 MPa) is performed for one hour, and a hydrogen gas is introduced up to 3 MPa and held for one hour to allow the alloy to nearly fully absorb the hydrogen, and then the hydrogen is desorbed by performing vacuum evacuation (0.01 MPa) for one hour. This process is repeated three times. Finally, a hydrogen absorption and desorption measurement (PCT characteristics evaluation) is performed across the range of the hydrogen pressure of 0.01 to 3 MPa as in the first cycle. The difference between the hydrogen absorption and desorption of the first time and the fifth time and the hydrogen absorption and desorption of the second to fourth times is the processing time, and the hydrogen absorption and desorption of the second to fourth times requires a shorter time as the hydrogen pressure is applied up to 3 MPa at once. After the hydrogen absorption and desorption cycle is thus performed five times in total, the hydrogen absorbing alloy powder is taken out and a granularity distribution measurement is performed. The range of the volume mean grain size MV after repeated hydrogen absorption and desorption is preferably 75 μm or larger and further preferably 80 μm or larger. A volume mean grain size MV within this range indicates that pulverization of the hydrogen absorbing alloy accompanying charge and discharge has not progressed when the alloy is actually incorporated into a battery, and that the alloy has excellent durability along with favorable corrosion resistance in an alkaline aqueous solution.

The volume mean grain size MV can be measured by a laser-diffraction granularity distribution measurement device. As the measurement device, for example, MT3300EXII manufactured by MicrotracBEL Corp. can be used.

It is believed that cracking of a hydrogen absorbing alloy is attributable to strain due to expansion and contraction of the crystal lattice accompanying hydrogen absorption and desorption. Therefore, when the hydrogen absorbing capacity is low, the lattice expands and contracts to a lesser extent, so that the alloy pulverizes less easily. However, on the other hand, when the hydrogen absorbing capacity is low, the discharge capacity as a battery material is low, which is undesirable because then securing a certain battery capacity leads to an increase in size and cost of the battery. Therefore, as a necessary condition for achieving the aforementioned volume mean grain size MV after repeated hydrogen absorption and desorption, it is preferable that the value of H/M (the atomic ratio between hydrogen H and metal M) that is an index of the hydrogen absorbing capacity at 1 MPa obtained from a PCT measurement at 80° C. be 0.92 or more. The value of H/M is further preferably 0.93 or more. When the value of H/M is within this range, it can be said that a hydrogen absorbing alloy that retains a sufficient discharge capacity and has high durability has been obtained.

On the other hand, the degree of elution of the alloy components when the hydrogen absorbing alloy is immersed in an alkaline aqueous solution has an influence on the corrosion resistance, and consequently an alloy with favorable durability is realized. Therefore, as a result of numerous evaluations conducted under various conditions, a magnetization of alloy powder with a volume mean grain size MV of about 35 μm after immersion in an alkaline aqueous solution was measured and associated with corrosion resistance. Specifically, a saturation magnetization of a sample obtained by immersing the alloy in a 7.15 mol/L aqueous potassium hydroxide solution at 80° C. for eight hours and then washing and drying the alloy was measured at a temperature of 25° C. with a magnetic field of 10 kOe using a vibrating sample magnetometer (VSM). It was found that an alloy with excellent durability could be obtained when the saturation magnetization was 60 emu/$m^2$ or less. The saturation magnetization is preferably 55 emu/$m^2$ or less.

The granularity distribution of the sample measured by the VSM is measured, and a specific surface area ($m^2$/g) is calculated from a value of a specific surface area CS ($m^2$/ml) and a value of the density of the hydrogen absorbing alloy (8.31 g/ml) that are calculated based on the result of this measurement, and a saturation magnetization (emu/$m^2$) per surface area is used as a basis for evaluation. This is to make the value of the saturation magnetization less influenced by the granularity distribution.

The hydrogen absorbing alloy according to this embodiment having been described above is an alloy of which the main phase has the $A_5B_{19}$-type crystal structure or the $A_2B_7$-type crystal structure. Specifically, the $A_2B_7$-type crystal structure is either a $Ce_2Ni_7$ phase that is a hexagonal system (2H) or a $Gd_2Co_7$ phase that is a rhombohedral system (3R), and coexistence of both phases poses no problems, but containing the former in a larger amount is more preferable. In the $A_5B_{19}$-type crystal structure (a $Gd_5Co_{19}$ phase that is a hexagonal system or a $Pr_5Co_{19}$ phase that is a rhombohedral system), containing the former in a larger amount is more preferable, and it is preferable that the $A_2B_7$-type crystal structure and the $A_5B_{19}$-type crystal structure combined account for at least 70 mass % or more. An $AB_3$-type crystal structure (a $CeNi_3$ phase that is a hexagonal system or a $PuNi_3$ phase that is a rhombohedral system) may be contained as a subphase up to 5 mass %, but a smaller amount is more preferable and not containing this crystal structure is most preferable. Further, from the aspect of the discharge capacity and the cycle life characteristic when the alloy is used for an alkaline storage battery, it is preferable that an $AB_2$-type crystal structure ($MgZn_2$ phase) or an $AB_5$-type crystal structure ($CaCu_5$ phase) be not contained. However, these crystal structures may be contained at such a level that does not cause degradation of the characteristics, for example, at a level of 5 mass % or less.

Figure 3:
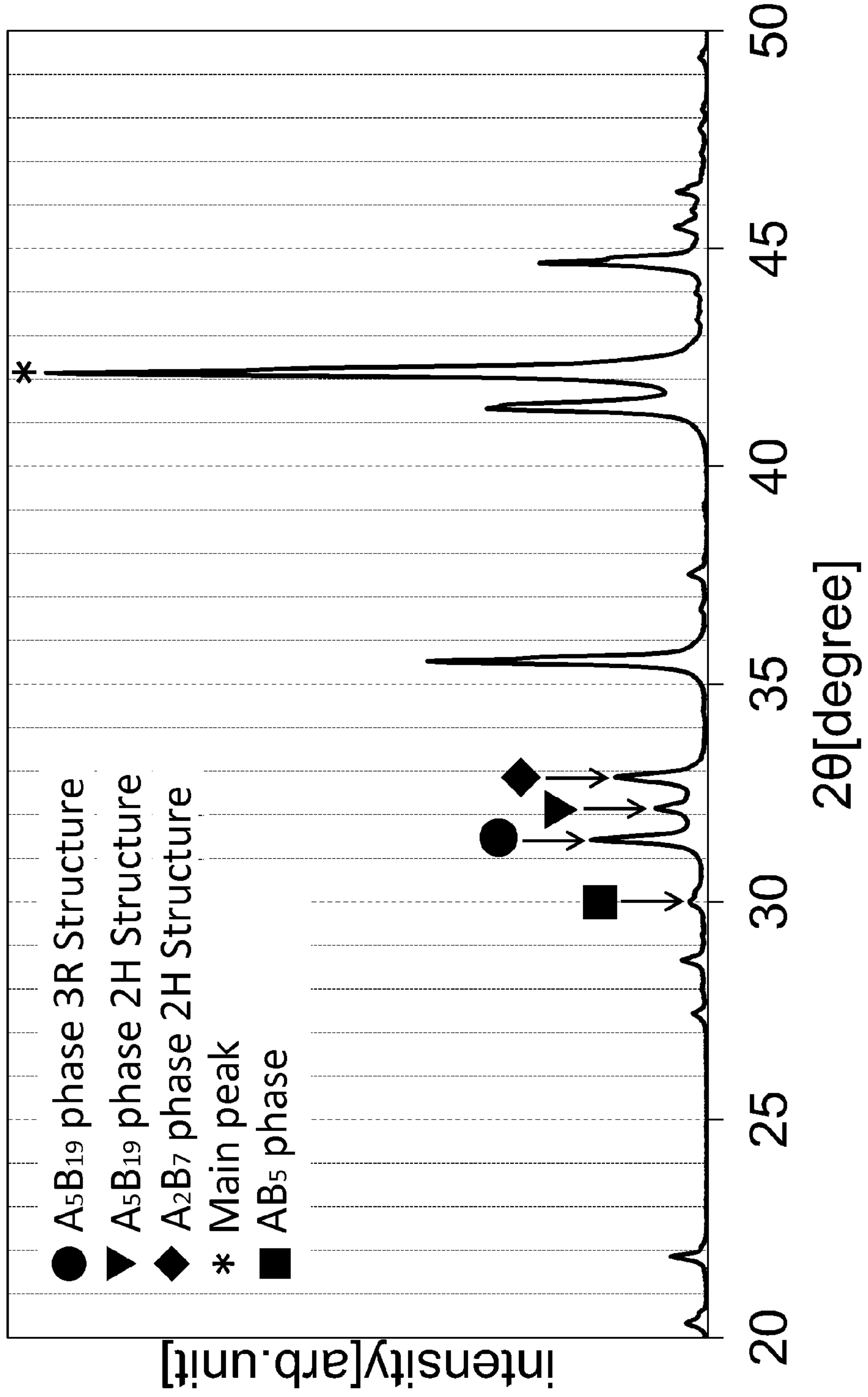
FIG. 3 is a graph showing one example of an X-ray diffraction measurement result of the hydrogen absorbing alloy according to the present invention.

In the hydrogen absorbing alloy of this embodiment, it is preferable that a ratio of a sum (β) of diffraction intensities of a (107) plane based on the 2H structure and a (1010) plane based on the 3R structure of the $A_2B_7$ phase to a sum (α) of diffraction intensities of a (109) plane based on the 2H structure and a (1013) plane based on the 3R structure of the $A_5B_{19}$ phase in an X-ray diffraction measurement using a Cu-Kα ray as an X-ray source meet $\beta/\alpha \leq 1$. When the value of the ratio β/α exceeds 1, the above-described hydrogen equilibrium pressure becomes so high that the alloy may become difficult to use for a battery. Diffraction lines will be specifically described using the XRD graph of FIG. 3. For a diffraction line, the peak indicated by the filled circle is a diffraction line of the (1013) plane based on the 3R structure of the $A_5B_{19}$ phase; the peak indicated by the downward-pointing filled triangle is a diffraction line of the (109) plane based on the 2H structure of the $A_5B_{19}$ phase; and the peak indicated by the filled rhombus is a diffraction line of the (107) plane based on the 2H structure of the $A_2B_7$ phase. While a diffraction line of the (1010) plane based on the 3R structure of the $A_2B_7$ phase does not appear in this graph, it is normally seen at a diffraction angle between the filled circle and the downward-pointing filled triangle.

In the hydrogen absorbing alloy of this embodiment, it is preferable that a ratio of a diffraction intensity (ζ) of a (101) plane of the $AB_5$ phase to a diffraction intensity (ε) of a strongest diffraction peak within a range of a diffraction angle of 40 to 45° in an X-ray diffraction measurement using a Cu-Kα ray as an X-ray source meet $\zeta/\varepsilon \leq 0.08$. When the ratio ζ/ε exceeds 0.08, the cycle life characteristic may degrade. The ratio ζ/ε is further preferably 0.05 or less. When diffraction lines are specifically described using the XRD graph of FIG. 3, this ratio is a ratio of the height of the diffraction peak indicated by the filled square to that of the strongest diffraction peak indicated by the asterisk.

The conditions for the X-ray diffraction measurement are as follows. Powder that has been pulverized to a grain size of under 75 μm is set in a sample holder. With Cu as the target, the measurement is performed using only a kβ filter under the conditions of tube voltage: 40 kV, tube current: 40 mA, scanning speed: 0.5°/min, scanning step: 0.02°, divergence slit (DS) 1°, scattering slit (SS): 1°, and without a light-receiving slit (RS).

Second Embodiment

A second embodiment was completed based on a finding that lowering the ratio of Mg and raising the ratio of component B to component A in the above-described first embodiment led to improved characteristics. Specifically, a hydrogen absorbing alloy for an alkaline storage battery that meets the following conditions in General Formula (A) is preferable: $0.08 \le c \le 0.18$ and $3.70 \le d+e+f \le 3.80$. In the following, differences from the first embodiment will be described.

Mg: $Mg_c$ (where $0.08 \le c \le 0.18$)

In this embodiment, it is preferable that the upper limit of Mg be restricted to 0.18. The cycle life characteristic, i.e., the durability is thereby improved. The value c is more preferably between 0.09 and 0.17, inclusive.

Ratio Between Component A and Component B: $3.70 \le d+e+f \le 3.80$

In this embodiment, it is preferable that the lower limit of the stoichiometric ratio that is the molar ratio of component B (Ni, M, and T) to component A, i.e., the value d+e+f indicated in the general formula be restricted to 3.70. The rate characteristic is thereby improved. The amount of Ni in the alloy surface may have an influence. The value d+e+f is more preferably more than 3.70 but less than 3.80. It is further preferably between 3.705 and 3.79, inclusive.

Third Embodiment

A third embodiment was completed based on a finding that lowering the ratios of Ce and Sm and raising the ratio of La among the rare earth elements, raising the ratio of Mg, using Al as the M element, and lowering the ratio of Al led to improved characteristics over a wide range of the ratio of component B to component A. Specifically, a hydrogen absorbing alloy for an alkaline storage battery that meets the following conditions in General Formula (A) is preferable: M being Al, $0 < a \le 0.08$, $0 \le b \le 0.08$, $0.14 \le c \le 0.24$, and $0.03 \le e < 0.10$. In the following, differences from the first embodiment will be described.

Rare Earth Elements: $La_{1-a-b}Ce_aSm_b$ (where $0 < a \le 0.08$, $0 \le b \le 0.08$)

In this embodiment, it is preferable that the upper limit of the value a that is the atomic ratio of Ce be restricted to 0.08. The cycle life characteristic is thereby improved. Further, it is preferable that the upper limit of the value b that is the atomic ratio of Sm be restricted to 0.08 so as to be balanced with Ce. As with Ce, the cycle life characteristic is improved. Thus, when the composition includes a large amount of La, the discharge capacity becomes high, and the discharge capacity characteristic further improves when other elements are combined.

Mg: $Mg_c$ (where $0.14 \le c \le 0.24$)

In this embodiment, it is preferable that the lower limit of Mg be restricted to 0.14. The discharge capacity characteristic is thereby improved. The value c is more preferably between 0.145 and 0.235, inclusive.

M: $M_e$ (where M is Al, $0.03 \le e < 0.10$)

In this embodiment, it is preferable that Al be used as M. Further, it is preferable that the atomic ratio of Al be restricted to less than 0.10. The discharge capacity characteristic is thereby improved. A more preferable value e is between 0.04 and 0.095, inclusive.

[Manufacturing Method of Hydrogen Absorbing Alloy]

Next, a manufacturing method of a hydrogen absorbing alloy common to the above-described embodiments will be described.

For the hydrogen absorbing alloys of the embodiments, rare earth elements (Ce, Sm, La, etc.) and metal elements such as magnesium (Mg), nickel (Ni), aluminum (Al), zinc (Zn), silicon (Si), tin (Sn), chromium (Cr), molybdenum (Mo), and vanadium (V) are weighed to a predetermined atomic ratio. Then, these elements are fed into an alumina crucible installed in a high-frequency induction furnace and melted in an atmosphere of an inert gas, such as an argon gas, and are then cast into casting molds to produce ingots of the hydrogen absorbing alloy. Alternatively, samples in the form of flakes with a thickness of about 200 to 500 μm may be directly produced using the strip casting method.

Since the hydrogen absorbing alloys of the embodiments contain Mg that has a low melting point and a high vapor pressure as a main component, if the raw materials of all the alloy components are melted at once, Mg may evaporate and make it difficult to obtain an alloy with a target chemical composition. Therefore, in manufacturing the hydrogen absorbing alloys of the embodiments by the melting method, it is preferable that the alloy components other than Mg be melted first and that then Mg raw materials such as metal Mg and an Mg alloy be fed into the molten metal. This melting step is desirably performed in an atmosphere of an inert gas, such as argon or helium, and is preferably performed specifically in an atmosphere of an inert gas that contains 80 vol % or more argon gas and has been adjusted to 0.05 to 0.2 MPa.

It is preferable that the alloy melted under the above-described conditions be thereafter cast into water-cooled casting molds and solidified into ingots of the hydrogen absorbing alloy. Next, a melting point ($T_m$) of the obtained ingots of each hydrogen absorbing alloy is measured using a differential scanning calorimeter (DSC). This is because it is preferable for the hydrogen absorbing alloys of the embodiments that the ingots after the casting be subjected to a heat treatment of being held in an atmosphere of either an inert gas, such as argon or helium, or a nitrogen gas, or a mixture gas of these gases at a temperature between 700° C. and the melting point ($T_m$) of the alloy for three to 50 hours, inclusive. By this heat treatment, a hydrogen absorbing alloy composed mainly of the $A_5B_{19}$ phase and the $A_2B_7$ phase can be produced. That the obtained hydrogen absorbing alloy is composed mainly of the $A_5B_{19}$ phase and the $A_2B_7$ phase can be confirmed by an X-ray diffraction measurement using a Cu-Kα ray.

When the temperature of the above-described heat treatment is lower than 700° C., diffusion of the elements becomes insufficient, so that a subphase, such as the $AB_5$ phase remains, which may lead to a decrease in discharge capacity or deterioration in cycle life characteristic of the battery. On the other hand, when the heat treatment temperature is equal to or higher than the melting point $T_m$ of the alloy minus 20° C. (equal to or higher than $T_m$−20° C.), the crystal grains of the main phase coarsen and the Mg component evaporates, which may result in a decrease in the hydrogen absorbing capacity due to pulverization or a change in the chemical composition. Therefore, the heat treatment temperature is preferably within a range of 750° C. to ($T_m$−30° C.). The heat treatment temperature is further preferably within a range of 770° C. to ($T_m$−50° C.).

When the holding time in the heat treatment is two hours or less, the ratio of the main phase cannot be stably set at 50 vol % or more. Moreover, as homogenization of the chemical components of the main phase becomes insufficient, expansion and contraction during hydrogen absorption and desorption become uneven, so that the resulting strain or the amount of defects may increase and adversely affect the cycle life characteristic. The holding time in the above-described heat treatment is preferably three hours or longer, and more preferably four hours or longer from the viewpoint of homogenization of the main phase and improvement of the crystallinity. However, when the holding time exceeds 50 hours, the amount of evaporation of Mg becomes large and the chemical composition changes, which may result in generation of a large amount of the $AB_5$-type subphase. Such a holding time may further cause an increase in the manufacturing cost and dust explosion due to evaporated Mg fine powder, and is therefore not preferable.

The heat-treated alloy is pulverized by a dry method or a wet method. When pulverizing the alloy by the dry method, pulverizing the alloy using, for example, a hammer mill or an ACM pulverizer can produce powder with a mean grain size of 20 to 100 μm. On the other hand, when pulverizing the alloy by the wet method, the alloy is pulverized using a bead mill, an attritor, etc. In particular, to obtain fine powder with a mean grain size of 20 μm or less, wet pulverization can more safely produce the fine powder and is therefore preferable. The grain size can be set to an appropriate range, for example, D50=8 to 100 μm, according to the application.

Here, as the aforementioned mean grain size D50 of the alloy grains, a value measured by a laser diffraction-scattering granularity distribution measurement device is used, and as the measurement device, for example, MT3300EXII manufactured by MicrotracBEL Corp. can be used.

The alloy grains having been pulverized as described above may be thereafter subjected to a surface treatment in which an alkali treatment using an alkaline aqueous solution, such as KOH or NaOH, or an acid treatment using nitric acid, sulfuric acid, or aqueous hydrochloric acid solution is performed. When such a surface treatment is performed, a layer composed of Ni (an alkali-treated layer or an acid-treated layer) can be formed at least in part of surfaces of the alloy grains. This can inhibit the progress of corrosion of the alloy and enhance the durability, and can thereby improve the cycle life characteristic of the battery and the discharge characteristic thereof over a wide temperature range. In particular, in the case of the acid treatment, it is preferable that the acid treatment be performed using hydrochloric acid, because then Ni can be precipitated with less damage to the alloy surfaces. In the case of pulverizing the alloy by the wet method, the surface treatment can also be simultaneously performed.

EXAMPLES

In the following, the present invention will be described based on Examples.

Example 1

An experiment was conducted in which cells for evaluation using hydrogen absorbing alloys No. 1 to 57 having the ingredient compositions shown in Tables 1-1 to 1-3 below as negative-electrode active materials were produced by a procedure to be described below and the characteristics of these cells were evaluated. Alloys No. 1 to 37 shown in Table 1 are examples of alloys that comply with the conditions of the present invention (examples of the invention). Alloys No. 38 to 57 shown in Table 1 are examples of alloys that do not meet the conditions of the present invention (comparative examples). Alloy No. 38 that is a comparative example was used as a reference alloy for evaluating the characteristics of the cells.

(Production of Negative-Electrode Active Material)

Raw materials (Sm, La, Ce, Mg, Ni, Al, Cr, Mo, and V, each with a degree of purity of 99% or more) of alloys No. 1 to 57 shown in Tables 1-1 to 1-3 were melted in an argon atmosphere (Ar: 100 vol %, 0.1 MPa) using a high-frequency induction heating furnace and cast into ingots. Next, these alloy ingots were subjected to a heat treatment of being held in an argon atmosphere (Ar: 90 vol %, 0.1 MPa) at a temperature of the melting point $T_m$ of the alloy—50° C. (940 to 1130° C.) for ten hours. Then, the ingots were coarsely pulverized and, using a hammer mill, finely pulverized until D50 on a mass basis reached 25 μm to be used as samples (negative-electrode active materials) for cell evaluation. For alloys No. 1 to 57, powders obtained by pulverization after heat treatment were subjected to an X-ray diffraction measurement. For the measurement, Ultima IV manufactured by Rigaku Corporation was used. As for measurement conditions, powder having been pulverized to a grain size of under 75 μm was set in a sample holder, and with Cu as the target, the measurement was performed using only a kβ filter under the conditions of tube voltage: 40 kV, tube current: 40 mA, scanning speed: 0.5°/min, scanning step: 0.02°, divergence slit (DS) 1°, scattering slit (SS): 1°, and without a light-receiving slit (RS). As a result, it was confirmed that No. 1 to 37 that are examples of the invention all fell within the suitable range of the diffraction intensity ratio of the present invention. The result is shown in Tables 2-1 to 2-3.

<Evaluation of Crackability Due to Repeated Hydrogen Absorption and Desorption>

An evaluation of crackability due to repeated hydrogen absorption and desorption is as follows.

A lump of each hydrogen absorbing alloy was pulverized and the granularity was adjusted such that the grains remained on a sieve with 150 μm openings and passed through a sieve with 1 mm openings. 7 g of that hydrogen absorbing alloy was packed into a measurement holder of a pressure-composition-temperature (PCT) evaluation device, and vacuum evacuation (0.01 MPa or less) was performed at 80° C. for one hour. Then, while the temperature was kept, a hydrogen absorption and desorption measurement (PCT characteristics evaluation) was performed across a range of the hydrogen pressure of 0.01 to 3 MPa. Thereafter, vacuum evacuation (0.01 MPa or less) was performed for one hour, and a hydrogen gas was introduced up to 3 MPa and held for one hour to allow the alloy to nearly fully absorb the hydrogen, and then vacuum evacuation (0.01 MPa or less) was performed for one hour to desorb the hydrogen. This cycle was repeated three times. Finally, as in the first cycle, a hydrogen absorption and desorption measurement (PCT characteristics evaluation) was performed across the range of the hydrogen pressure of 0.01 to 3 MPa. After this hydrogen absorption and desorption cycle was performed five times, the hydrogen absorbing alloy powder was taken out and a granularity distribution measurement was performed. Values of the volume mean grain size MV after the repeated hydrogen absorption and desorption are shown in Tables 1-1 to 1-3.

<Saturation Magnetization>

Measurement of a saturation magnetization after immersion in an alkaline aqueous solution is performed by the following procedure.

First, 50 g of a 7.15 mol/L aqueous potassium hydroxide solution having a temperature of 80° C. and 20 g of each hydrogen absorbing alloy with the volume mean diameter (MV) adjusted to 35 μm are put into a glass beaker. Next, while being stirred with a magnetic stirrer, the hydrogen absorbing alloy is immersed for eight hours with the liquid temperature kept at 80° C. After the time has elapsed, washing the hydrogen absorbing alloy with water is repeatedly performed until the washing water reaches a pH of 12 or less, and then the hydrogen absorbing alloy is vacuum-dried at 70° C. for six hours. About 200 mg is measured out of the obtained sample and fixed inside a measurement container. Using a vibrating sample magnetometer (VSM), the saturation magnetization (emu/g) is measured by applying a magnetic field of 10 kOe at 25° C. Meanwhile, a granularity distribution of the sample having been immersed in the aforementioned alkaline aqueous solution is measured, and a specific surface area ($m^2/g$) is calculated from a value of a specific surface area CS ($m^2/ml$) and a value of the density of the hydrogen absorbing alloy (8.31 g/ml) that are calculated based on the result of this measurement. With a saturation magnetization ($emu/m^2$) per surface area as a basis for evaluation, saturation magnetizations are shown as amounts of magnetization in Tables 1-1 to 1-3. This process is to avoid making the saturation magnetization dependent on the granularity distribution.

<PCT Characteristics Evaluation>

A PCT characteristics evaluation is performed by the following procedure.

A lump of each hydrogen absorbing alloy is pulverized, and the granularity is adjusted to a size between 150 μm and 1 mm, inclusive, using sieves in the same manner as described above. This hydrogen absorbing alloy is packed in a PCT measurement device, and vacuum evacuation (0.01 MPa or less) is performed at 80° C. for one hour. Next, while the temperature is maintained, a hydrogen gas at 3 MPa is pressurized and held for 3.5 hours to allow the hydrogen absorbing alloy to absorb the hydrogen, and then vacuum evacuation is performed for one hour to desorb the hydrogen. Thus, an activation treatment is performed. Thereafter, a hydrogen absorption and desorption measurement (PCT characteristics evaluation) is performed across a range of the hydrogen pressure of 0.01 to 1 MPa. In Tables 1-1 to 1-3, the hydrogen pressures (P0.5) when the hydrogen absorbing capacity (H/M) during hydrogen desorption at 80° C. is 0.5 are shown; the hydrogen storage capacities when 1 MPa is applied are shown as H/M; and calculated values of B1=log [(P0.7/P0.3)/0.4] are shown as plateau slopes.

(Production of Cells for Evaluation)

<Negative Electrode>

The negative-electrode active material prepared as described above, Ni powder as a conductive assistant, and two types of binders (styrene-butadiene rubber (SBR) and carboxymethylcellulose (CMC)) were mixed to a ratio by weight of negative-electrode active material:Ni powder: SBR:CMC=95.5:3.0:1.0:0.5 and kneaded into a paste-like composition. This paste-like composition was applied to a perforated metal and dried at 80° C., and then the perforated metal was roll-pressed under a load of 15 kN to obtain a negative electrode.

<Positive Electrode>

Nickel hydroxide ($Ni(OH)_2$), metallic cobalt (Co) as a conductive assistant, and two types of binders (styrene-butadiene rubber (SBR) and carboxymethylcellulose (CMC)) were mixed to a ratio by mass of $Ni(OH)_2$:Co:SBR: CMC=95.5:2.0:2.0:0.5 and kneaded into a paste-like composition. This paste-like composition was applied to a porous nickel and dried at 80° C., and then the porous nickel was roll-pressed under a load of 15 kN to obtain a positive electrode.

<Electrolytic Solution>

As the electrolytic solution, an alkaline aqueous solution obtained by mixing potassium hydroxide (KOH) into pure water to a concentration of 6 mol/L was used.

<Cell for Evaluation>

The above-described positive electrode and the above-described negative electrode were placed inside an acrylic casing as a counter electrode and a working electrode, respectively, and then the above-described electrolytic solution was poured into the casing. Thus, a cell having an Hg/HgO electrode as a reference electrode was produced and used for an evaluation test. Here, the ratio between the capacities of the working electrode and the counter electrode was adjusted to working electrode: counter electrode=1:3.

(Evaluation of Characteristics of Cell)

An evaluation test of the cells for evaluation according to alloys No. 1 to 57 obtained as described above was performed by the following procedure. The evaluation temperature was set to 40° C. in all cases.

(1) Discharge Capacity of Electrode

The discharge capacity of the electrode as the working electrode was checked by the following procedure. Constant-current charging was performed at a current value of 80 mA/g per active material of the working electrode for ten hours, and then constant-current discharging was performed at a current value of 40 mA/g per active material of the working electrode. A condition for ending the discharging was that the potential of the working electrode was −0.5 V. This charge-discharge cycle was repeated ten times, and a maximum value of the discharge capacity was used as the discharge capacity of that electrode as the working electrode. It is confirmed that as a result of ten charge-discharge cycles, the discharge capacity of the working electrode became saturated and stabilized.

For measured discharge capacities, using the discharge capacity of alloy No. 38 shown in Table 2-2 as a reference capacity, a ratio of each measured discharge capacity to that reference capacity was calculated by the following Formula (C). Alloys of which this ratio was more than 1.15 were evaluated as having a higher discharge capacity than alloy No. 38 and therefore excellent.

$$\text{Discharge capacity} = (\text{discharge capacity of alloy being evaluated})/(\text{discharge capacity of alloy No. 38}) \quad (C)$$

(2) Cycle Life Characteristic

Using the cells of which the discharge capacities of the electrodes as the working electrodes were checked in (1) Discharge Capacity of Electrode described above, the cycle life characteristic of each working electrode was obtained by the following procedure.

When a current value required to complete, in one hour, charging or discharging of the discharge capacity of each electrode as the working electrode checked in (1) Discharge Capacity of Electrode described above is referred to as 1C, performing constant-current charging and constant-current discharging at a current value of C/2 in a range of 20 to 80% of a charging rate of the working electrode is referred to as one cycle. This cycle was repeatedly performed up to 500 cycles, and the discharge capacity after 500 cycles was measured. A capacity maintenance rate was obtained by the following Formula (D):

$$\text{Capacity maintenance rate} = (\text{discharge capacity in the } 500th \text{ cycle})/(\text{discharge capacity in the first cycle}) \quad (D)$$

For evaluation of the cycle life characteristic, using the capacity maintenance rate after 500 cycles of alloy No. 38 shown in Table 2-2 as a reference capacity maintenance rate, a ratio to this reference capacity maintenance rate was calculated by the following Formula (E). Alloys of which this ratio was more than 1.15 were evaluated as having a higher cycle life characteristic than alloy No. 38 and therefore excellent.

$$\text{Cycle life characteristic} = (\text{capacity maintenance rate after 500 cycles of alloy being measured}) / (\text{capacity maintenance rate after 500 cycles of alloy No. 38}) \tag{E}$$

(3) Rate Characteristic

Using the cells of which the discharge capacities of the electrodes as the working electrodes were checked in (1) Discharge Capacity of Electrode described above, the rate characteristic of each working electrode was obtained by the following procedure.

When a current value required to complete, in one hour, charging or discharging of the discharge capacity of each electrode as the working electrode checked in (1) Discharge Capacity of Electrode described above is referred to as 1C, first, constant-current charging is performed at C/5 for 7.5 hours, and then constant-current discharging is performed at C/5 until the potential of the working electrode reaches −0.5 V, and the discharge capacity at this point is referred to as "C/5 discharge capacity." Next, constant-current charging is performed at C/5 for 7.5 hours, and then constant-current discharging is performed at 5C until the potential of the working electrode reaches −0.5 V, and the discharge capacity at this point is referred to as "5C discharge capacity." A capacity maintenance rate in 5C discharging was obtained by the following Formula (F):

$$\text{Capacity maintenance rate in } 5C \text{ discharging} = (5C \text{ discharge capacity}) / (C/5 \text{ discharge capacity}) \tag{F}$$

For the evaluation result of the rate characteristic, using the capacity maintenance rate in 5C discharging of alloy No. 38 shown in Table 2-2 as a reference capacity maintenance rate, a ratio to this reference capacity maintenance rate was calculated by the following Formula (G). Alloys of which this ratio was more than 1.15 was evaluated as having a higher rate characteristic than alloy No. 38 and therefore excellent.

$$\text{Rate characteristic} = (\text{capacity maintenance rate in } 5C \text{ discharging of alloy being measured}) / (\text{capacity maintenance rate in } 5C \text{ discharging of alloy No. 38}) \tag{G}$$

(4) Cost

For the alloy cost, a raw material cost for manufacturing each of the alloys having the ingredient compositions listed in Tables 1-1 to 1-3 by melting metals with a degree of purity of 99% was relatively evaluated. The result is shown in Tables 2-1 to 2-3. Alloys that were 20% or more expensive than alloy No. 38 (reference cost) were evaluated as C; alloys that were at the same price as or less than 20% more expensive than alloy No. 38 were evaluated as B; and alloys that were less expensive than alloy No. 38 were evaluated as A.

As is clear from Tables 2-1 to 2-3, compared with alloy No. 38, alloys No. 1 to 37 that are examples of the invention are improved in a balanced manner in the evaluation values for the discharge capacity, the cycle life characteristic, and the rate characteristic as well as in the hydrogen equilibrium pressure, and are also advantageous in terms of costs. By contrast, it can be seen that alloys No. 38 to 57 that are comparative examples have evaluation values below the criteria for one or more of the characteristics, or have an evaluation of B or C for the cost. When the equilibrium pressure is higher than a value within the range of the present invention, the performance of absorbing a gas generated during charging degrades, so that, in a closed space, inflation occurs and the battery expands. In some cases, a safety valve is actuated and the functions of the battery can no longer be retained.

TABLE 1-1

| Alloy No. | Ingredient composition of hydrogen absorbing alloy | P0.5 MPa | H/M Ratio between the numbers of atoms | MV μm | Amount of magnetization emu/m$^2$ | Plateau slope Value of Formula B1 |
|---|---|---|---|---|---|---|
| 1 | $(La_{0.99}Ce_{0.01})_{0.84}Mg_{0.16}Ni_{3.61}Al_{0.09}$ | 0.035 | 0.96 | 97.4 | 51.4 | 2.48 |
| 2 | $(La_{0.99}Ce_{0.01})_{0.84}Mg_{0.16}Ni_{3.66}Al_{0.09}Cr_{0.008}$ | 0.045 | 0.97 | 93.8 | 50.4 | 2.15 |
| 3 | $(La_{0.99}Ce_{0.01})_{0.82}Mg_{0.18}Ni_{3.56}Al_{0.09}$ | 0.037 | 0.96 | 89.8 | 51.8 | 2.02 |
| 4 | $(La_{0.99}Ce_{0.01})_{0.82}Mg_{0.18}Ni_{3.61}Al_{0.09}Cr_{0.010}$ | 0.043 | 0.94 | 96.8 | 50.6 | 1.98 |
| 5 | $(La_{0.97}Ce_{0.02}Sm_{0.01})_{0.81}Mg_{0.19}Ni_{3.56}Al_{0.09}$ | 0.049 | 0.94 | 89.5 | 51.9 | 1.72 |
| 6 | $(La_{0.97}Ce_{0.02}Sm_{0.01})_{0.81}Mg_{0.19}Ni_{3.61}Al_{0.09}Cr_{0.008}$ | 0.060 | 0.96 | 92.0 | 49.9 | 1.69 |
| 7 | $(La_{0.97}Ce_{0.02}Sm_{0.01})_{0.79}Mg_{0.21}Ni_{3.46}Al_{0.09}Cr_{0.003}$ | 0.036 | 0.97 | 88.8 | 50.8 | 1.82 |
| 8 | $(La_{0.98}Ce_{0.02}Sm_{0.01})_{0.79}Mg_{0.21}Ni_{3.51}Al_{0.09}Cr_{0.005}$ | 0.049 | 0.98 | 85.8 | 50.5 | 1.48 |
| 9 | $(La_{0.98}Ce_{0.01}Sm_{0.01})_{0.76}Mg_{0.24}Ni_{3.46}Al_{0.09}Cr_{0.012}$ | 0.046 | 0.98 | 97.0 | 48.0 | 2.41 |
| 10 | $(La_{0.96}Ce_{0.03}Sm_{0.01})_{0.83}Mg_{0.17}Ni_{3.61}Al_{0.09}Cr_{0.015}$ | 0.045 | 1.01 | 85.0 | 48.5 | 1.63 |
| 11 | $(La_{0.94}Ce_{0.05}Sm_{0.01})_{0.82}Mg_{0.18}Ni_{3.56}Al_{0.09}Cr_{0.020}$ | 0.050 | 0.94 | 83.8 | 47.0 | 1.28 |
| 12 | $(La_{0.91}Ce_{0.07}Sm_{0.02})_{0.81}Mg_{0.19}Ni_{3.51}Al_{0.09}Cr_{0.025}$ | 0.047 | 0.96 | 84.6 | 45.5 | 1.35 |
| 13 | $(La_{0.89}Ce_{0.07}Sm_{0.04})_{0.84}Mg_{0.16}Ni_{3.66}Al_{0.09}Cr_{0.030}$ | 0.070 | 1.02 | 84.0 | 43.7 | 1.02 |
| 14 | $(La_{0.96}Ce_{0.01}Sm_{0.03})_{0.79}Mg_{0.21}Ni_{3.51}Al_{0.09}Cr_{0.040}$ | 0.052 | 1.00 | 82.2 | 41.0 | 1.08 |
| 15 | $(La_{0.94}Ce_{0.01}Sm_{0.05})_{0.81}Mg_{0.19}Ni_{3.56}Al_{0.09}Cr_{0.008}$ | 0.054 | 0.98 | 103.2 | 48.4 | 2.88 |
| 16 | $(La_{0.92}Ce_{0.01}Sm_{0.07})_{0.83}Mg_{0.17}Ni_{3.61}Al_{0.09}Cr_{0.008}$ | 0.053 | 0.96 | 97.2 | 49.5 | 2.68 |
| 17 | $(La_{0.94}Ce_{0.02}Sm_{0.01})_{0.82}Mg_{0.18}Ni_{3.64}Al_{0.06}Cr_{0.008}$ | 0.070 | 0.96 | 87.5 | 51.8 | 1.78 |
| 18 | $(La_{0.97}Ce_{0.02}Sm_{0.01})_{0.82}Mg_{0.18}Ni_{3.66}Al_{0.04}Mo_{0.008}$ | 0.088 | 0.94 | 85.5 | 53.5 | 1.50 |
| 19 | $(La_{0.94}Ce_{0.03}Sm_{0.03})_{0.85}Mg_{0.15}Ni_{3.67}Al_{0.08}V_{0.008}$ | 0.048 | 0.99 | 83.0 | 50.5 | 1.19 |
| 20 | $(La_{0.91}Ce_{0.01}Sm_{0.08})_{0.85}Mg_{0.15}Ni_{3.62}Al_{0.09}Cr_{0.005}$ | 0.044 | 0.98 | 95.0 | 51.4 | 1.68 |

TABLE 1-2

| Alloy No. | Ingredient composition of hydrogen absorbing alloy | P0.5 MPa | H/M Ratio between the numbers of atoms | MV μm | Amount of magnetization emu/m$^2$ | Plateau slope Value of Formula B1 |
|---|---|---|---|---|---|---|
| 21 | $(La_{0.855}Ce_{0.025}Sm_{0.12})_{0.88}Mg_{0.12}Ni_{3.68}Al_{0.09}Cr_{0.008}$ | 0.050 | 0.98 | 90.3 | 44.5 | 1.65 |
| 22 | $(La_{0.89}Ce_{0.03}Sm_{0.08})_{0.86}Mg_{0.14}Ni_{3.675}Al_{0.075}Cr_{0.005}$ | 0.050 | 0.98 | 82.5 | 47.5 | 1.54 |
| 23 | $(La_{0.88}Ce_{0.02}Sm_{0.08})_{0.88}Mg_{0.12}Ni_{3.66}Al_{0.08}Cr_{0.005}$ | 0.038 | 0.99 | 95.5 | 50.7 | 1.82 |
| 24 | $(La_{0.85}Ce_{0.03}Sm_{0.12})_{0.865}Mg_{0.135}Ni_{3.64}Al_{0.05}Zn_{0.01}Cr_{0.006}$ | 0.051 | 1.00 | 92.1 | 50.0 | 2.25 |
| 25 | $(La_{0.85}Ce_{0.03}Sm_{0.12})_{0.865}Mg_{0.135}Ni_{3.67}Al_{0.07}Zn_{0.02}Cr_{0.005}$ | 0.058 | 0.96 | 85.9 | 48.6 | 1.85 |
| 26 | $(La_{0.92}Ce_{0.02}Sm_{0.06})_{0.84}Mg_{0.16}Ni_{3.67}Al_{0.04}Cr_{0.005}$ | 0.072 | 1.02 | 89.4 | 52.3 | 1.90 |
| 27 | $(La_{0.92}Ce_{0.02}Sm_{0.06})_{0.84}Mg_{0.16}Ni_{3.68}Al_{0.07}Sn_{0.02}Cr_{0.006}$ | 0.060 | 0.96 | 87.2 | 49.5 | 1.94 |
| 28 | $(La_{0.855}Ce_{0.025}Sm_{0.12})_{0.88}Mg_{0.12}Ni_{3.61}Al_{0.07}Si_{0.02}Cr_{0.008}$ | 0.033 | 0.98 | 94.4 | 48.2 | 2.00 |
| 29 | $(La_{0.855}Ce_{0.025}Sm_{0.12})_{0.88}Mg_{0.12}Ni_{3.67}Al_{0.04}Cr_{0.009}$ | 0.057 | 1.02 | 98.8 | 54.2 | 2.42 |
| 30 | $(La_{0.855}Ce_{0.025}Sm_{0.12})_{0.88}Mg_{0.12}Ni_{3.67}Al_{0.07}Si_{0.02}Cr_{0.007}$ | 0.058 | 0.98 | 90.1 | 49.3 | 2.20 |
| 31 | $(La_{0.86}Ce_{0.04}Sm_{0.10})_{0.88}Mg_{0.12}Ni_{3.61}Al_{0.09}Cr_{0.005}Mo_{0.005}$ | 0.033 | 0.95 | 82.5 | 44.8 | 1.49 |
| 32 | $(La_{0.86}Ce_{0.04}Sm_{0.10})_{0.88}Mg_{0.12}Ni_{3.64}Al_{0.06}Cr_{0.01}Mo_{0.01}$ | 0.047 | 0.94 | 81.0 | 44.6 | 1.36 |
| 33 | $(La_{0.86}Ce_{0.04}Sm_{0.10})_{0.88}Mg_{0.12}Ni_{3.69}Al_{0.09}Cr_{0.01}Mo_{0.005}$ | 0.057 | 0.94 | 83.1 | 45.9 | 1.32 |
| 34 | $(La_{0.83}Ce_{0.03}Sm_{0.4})_{0.90}Mg_{0.10}Ni_{3.64}Al_{0.09}Cr_{0.006}$ | 0.031 | 0.95 | 90.0 | 52.8 | 1.35 |
| 35 | $(La_{0.83}Ce_{0.03}Sm_{0.14})_{0.90}Mg_{0.10}Ni_{3.69}Al_{0.06}Cr_{0.008}$ | 0.044 | 0.96 | 86.4 | 44.0 | 1.68 |
| 36 | $(La_{0.83}Ce_{0.03}Sm_{0.14})_{0.90}Mg_{0.10}Ni_{3.67}Al_{0.09}Cr_{0.01}$ | 0.041 | 0.98 | 80.0 | 42.0 | 1.75 |
| 37 | $(La_{0.78}Ce_{0.09}Sm_{0.13})_{0.90}Mg_{0.10}Ni_{3.65}Al_{0.09}Cr_{0.04}$ | 0.042 | 0.94 | 77.2 | 40.8 | 1.12 |
| 38 | $La_{0.9}Ce_{0.1}Ni_{4.0}Co_{0.4}Mn_{0.4}Al_{0.3}$ | 0.042 | 0.82 | 36.7 | 78.0 | 0.42 |

TABLE 1-3

| Alloy No. | Ingredient composition of hydrogen absorbing alloy | P0.5 MPa | H/M Ratio between the numbers of atoms | MV μm | Amount of magnetization emu/m$^2$ | Plateau slope Value of Formula B1 |
|---|---|---|---|---|---|---|
| 39 | $(La_{0.85}Sm_{0.15})_{0.85}Mg_{0.15}Ni_{3.48}Al_{0.15}$ | 0.018 | 0.92 | 78.0 | 52.4 | 1.84 |
| 40 | $(La_{0.59}Sm_{0.41})_{0.89}Mg_{0.11}Ni_{3.6}Al_{0.10}$ | 0.148 | 0.90 | 96.5 | 55.5 | 3.12 |
| 41 | $La_{0.8}Mg_{0.2}Ni_{3.63}Mn_{0.08}$ | 0.035 | 0.93 | 73.0 | 64.5 | 1.24 |
| 42 | $(La_{0.375}Nd_{0.625})_{0.80}Mg_{0.20}Ni_{3.50}Al_{0.20}$ | 0.410 | 0.88 | 98.2 | 49.5 | 3.05 |
| 43 | $(Sm_{0.6}Nd_{0.4})_{0.9}Mg_{0.1}Ni_{3.33}Al_{0.17}$ | 0.093 | 0.94 | 92.5 | 49.8 | 3.02 |
| 44 | $(La_{0.4}Sm_{0.52}Zr_{0.08})_{0.85}Mg_{0.15}Ni_{3.7}Al_{0.1}$ | 0.125 | 0.92 | 96.4 | 52.8 | 3.10 |
| 45 | $(La_{0.56}Pr_{0.11}Nd_{0.33})_{0.90}Mg_{0.10}Ni_{3.4}Al_{0.2}$ | 0.150 | 0.90 | 100.8 | 50.4 | 3.25 |
| 46 | $(La_{0.53}Sm_{0.36})_{0.89}Mg_{0.11}Ni_{3.61}Al_{0.09}$ | 0.110 | 0.93 | 96.5 | 56.2 | 2.88 |
| 47 | $(La_{0.76}Pr_{0.18}Sm_{0.08})_{0.82}Mg_{0.18}Ni_{3.50}Al_{0.15}$ | 0.011 | 0.94 | 89.5 | 53.8 | 2.00 |
| 48 | $(La_{0.75}Sm_{0.25})_{0.80}Mg_{0.20}Ni_{3.60}Al_{0.06}$ | 0.148 | 0.94 | 84.0 | 55.8 | 1.75 |
| 49 | $(La_{0.8}Sm_{0.2})_{0.80}Mg_{0.20}Ni_{3.53}Al_{0.07}$ | 0.130 | 0.96 | 78.1 | 55.2 | 1.10 |
| 50 | $(La_{0.20}Nd_{0.40}Sm_{0.39}Zr_{0.01})_{0.89}Mg_{0.11}Ni_{3.27}Al_{0.17}Cr_{0.01}$ | 0.058 | 0.92 | 96.2 | 48.8 | 3.14 |
| 51 | $La_{0.78}Mg_{0.22}Ni_{3.67}Al_{0.10}$ | 0.120 | 0.96 | 78.4 | 58.2 | 1.22 |
| 52 | $La_{0.64}Sm_{0.08}Nd_{0.08}Mg_{0.20}Ni_{3.64}Al_{0.10}$ | 0.125 | 0.96 | 59.4 | 50.8 | 0.69 |
| 53 | $La_{0.63}Nd_{0.16}Mg_{0.21}Ni_{3.53}Al_{0.11}$ | 0.100 | 0.97 | 68.2 | 51.8 | 1.18 |
| 54 | $(La_{0.78}Sm_{0.22})_{0.83}Mg_{0.17}Ni_{3.70}Al_{0.14}$ | 0.130 | 0.90 | 71.2 | 52.4 | 0.98 |
| 55 | $(La_{0.5}Sm_{0.5})_{0.96}Mg_{0.04}Ni_{3.73}Al_{0.02}$ | 0.122 | 0.92 | 98.5 | 61.2 | 3.24 |
| 56 | $(La_{0.88}Ce_{0.12})_{0.83}Mg_{0.17}Ni_{3.67}Al_{0.01}$ | 0.144 | 0.97 | 59.8 | 64.1 | 0.76 |
| 57 | $(La_{0.7}Sm_{0.3})_{0.80}Mg_{0.20}Ni_{3.48}Al_{0.10}Cr_{0.07}$ | 0.115 | 0.93 | 72.8 | 49.5 | 1.10 |

TABLE 2-1

| Alloy No. | Characteristics of electrode (relative to alloy No. 38) Discharge capacity | Cycle life characteristic | Rate characteristic | Ratio of X-ray diffraction intensity β/α | ζ/ε | Cost (relative to alloy No. 38) | Remarks |
|---|---|---|---|---|---|---|---|
| 1 | 1.18 | 1.40 | 1.21 | 0.35 | 0.03 | ○ | Invention Example |
| 2 | 1.20 | 1.34 | 1.23 | 0.28 | 0.04 | ○ | Invention Example |
| 3 | 1.20 | 1.36 | 1.26 | 0.42 | 0.03 | ○ | Invention Example |
| 4 | 1.19 | 1.38 | 1.20 | 0.35 | 0.04 | ○ | Invention Example |
| 5 | 1.17 | 1.34 | 1.23 | 0.48 | 0.03 | ○ | Invention Example |
| 6 | 1.22 | 1.31 | 1.19 | 0.74 | 0.02 | ○ | Invention Example |
| 7 | 1.21 | 1.21 | 1.24 | 0.65 | 0.00 | ○ | Invention Example |
| 8 | 1.18 | 1.31 | 1.27 | 0.22 | 0.00 | ○ | Invention Example |
| 9 | 1.20 | 1.33 | 1.21 | 0.66 | 0.00 | ○ | Invention Example |
| 10 | 1.23 | 1.22 | 1.29 | 0.81 | 0.03 | ○ | Invention Example |
| 11 | 1.16 | 1.36 | 1.30 | 0.75 | 0.03 | ○ | Invention Example |
| 12 | 1.19 | 1.37 | 1.26 | 0.80 | 0.02 | ○ | Invention Example |
| 13 | 1.24 | 1.22 | 1.28 | 0.35 | 0.05 | ○ | Invention Example |

TABLE 2-1-continued

| Alloy No. | Characteristics of electrode (relative to alloy No. 38) Discharge capacity | Cycle life characteristic | Rate characteristic | Ratio of X-ray diffraction intensity β/α | ζ/ε | Cost (relative to alloy No. 38) | Remarks |
|---|---|---|---|---|---|---|---|
| 14 | 1.22 | 1.35 | 1.29 | 0.28 | 0.03 | ○ | Invention Example |
| 15 | 1.20 | 1.32 | 1.18 | 0.65 | 0.02 | ○ | Invention Example |
| 16 | 1.17 | 1.32 | 1.22 | 0.45 | 0.03 | ○ | Invention Example |
| 17 | 1.19 | 1.24 | 1.26 | 0.51 | 0.02 | ○ | Invention Example |
| 18 | 1.17 | 1.24 | 1.25 | 0.49 | 0.04 | ○ | Invention Example |
| 19 | 1.22 | 1.20 | 1.22 | 0.30 | 0.05 | ○ | Invention Example |
| 20 | 1.20 | 1.24 | 1.21 | 0.40 | 0.02 | ○ | Invention Example |

TABLE 2-2

| Alloy No. | Characteristics of electrode (relative to alloy No. 38) Discharge capacity | Cycle life characteristic | Rate characteristic | Ratio of X-ray diffraction intensity β/α | ζ/ε | Cost (relative to alloy No. 38) | Remarks |
|---|---|---|---|---|---|---|---|
| 21 | 1.19 | 1.30 | 1.23 | 0.22 | 0.02 | ○ | Invention Example |
| 22 | 1.23 | 1.36 | 1.25 | 0.55 | 0.03 | ○ | Invention Example |
| 23 | 1.24 | 1.35 | 1.24 | 0.50 | 0.04 | ○ | Invention Example |
| 24 | 1.21 | 1.30 | 1.12 | 0.92 | 0.00 | ○ | Invention Example |
| 25 | 1.20 | 1.35 | 1.22 | 0.45 | 0.02 | ○ | Invention Example |
| 26 | 1.23 | 1.24 | 1.14 | 0.94 | 0.02 | ○ | Invention Example |
| 27 | 1.21 | 1.23 | 1.27 | 0.70 | 0.04 | ○ | Invention Example |
| 28 | 1.20 | 1.29 | 1.14 | 0.90 | 0.02 | ○ | Invention Example |
| 29 | 1.24 | 1.24 | 1.16 | 0.95 | 0.02 | ○ | Invention Example |
| 30 | 1.21 | 1.38 | 1.23 | 0.68 | 0.02 | ○ | Invention Example |
| 31 | 1.19 | 1.38 | 1.15 | 0.92 | 0.03 | ○ | Invention Example |
| 32 | 1.19 | 1.36 | 1.22 | 0.78 | 0.02 | ○ | Invention Example |
| 33 | 1.19 | 1.30 | 1.22 | 0.23 | 0.04 | ○ | Invention Example |
| 34 | 1.18 | 1.29 | 1.24 | 0.65 | 0.02 | ○ | Invention Example |
| 35 | 1.19 | 1.35 | 1.19 | 0.48 | 0.03 | ○ | Invention Example |
| 36 | 1.18 | 1.23 | 1.25 | 0.25 | 0.02 | ○ | Invention Example |
| 37 | 1.19 | 1.21 | 1.14 | 0.15 | 0.03 | ○ | Invention Example |
| 38 | 1.00 | 1.00 | 1.00 | — | — | Δ | Comparative Example Reference value |

TABLE 2-3

| Alloy No. | Characteristics of electrode (relative to alloy No. 38) Discharge capacity | Cycle life characteristic | Rate characteristic | Ratio of X-ray diffraction intensity β/α | ζ/ε | Cost (relative to alloy No. 38) | Remarks |
|---|---|---|---|---|---|---|---|
| 39 | 1.06 | 1.10 | 0.97 | 0.05 | 0.02 | Δ | Comparative Example |
| 40 | 1.04 | 1.04 | 1.10 | 0.20 | 0.08 | Δ | Comparative Example |
| 41 | 1.15 | 0.90 | 1.12 | 0.64 | 0.07 | ○ | Comparative Example |
| 42 | 1.02 | 1.13 | 1.01 | 0.72 | 0.05 | x | Comparative Example |
| 43 | 1.10 | 1.10 | 0.98 | 20.00 | 0.06 | x | Comparative Example |
| 44 | 1.06 | 1.02 | 0.95 | 0.68 | 0.0 | Δ | Comparative Example |
| 45 | 1.05 | 0.98 | 1.00 | 2.50 | 0.02 | x | Comparative Example |
| 46 | 1.04 | 1.02 | 1.16 | 0.22 | 0.06 | Δ | Comparative Example |
| 47 | 1.10 | 1.05 | 1.10 | 0.40 | 0.04 | x | Comparative Example |
| 48 | 1.08 | 1.08 | 1.02 | 0.80 | 0.05 | Δ | Comparative Example |
| 49 | 1.10 | 1.05 | 1.08 | 4.82 | 0.04 | Δ | Comparative Example |
| 50 | 1.08 | 1.14 | 0.92 | 18.20 | 0.03 | x | Comparative Example |
| 51 | 1.17 | 0.96 | 1.10 | 1.05 | 0.09 | ○ | Comparative Example |
| 52 | 1.16 | 1.04 | 1.13 | 0.40 | 0.05 | x | Comparative Example |
| 53 | 1.18 | 1.07 | 1.10 | 1.82 | 0.07 | x | Comparative Example |
| 54 | 1.10 | 1.03 | 1.08 | 0.85 | 0.10 | Δ | Comparative Example |
| 55 | 1.09 | 0.96 | 1.15 | 0.65 | 0.06 | Δ | Comparative Example |
| 56 | 1.16 | 0.89 | 1.12 | 0.76 | 0.02 | ○ | Comparative Example |
| 57 | 1.12 | 1.05 | 0.98 | 0.89 | 0.02 | Δ | Comparative Example |

INDUSTRIAL APPLICABILITY

The hydrogen absorbing alloy of the present invention is superior to conventionally used $AB_5$-type hydrogen absorbing alloys in all of the discharge capacity, the cycle life, and the rate characteristic, and is therefore not only suitable as a negative electrode material for alkaline storage batteries intended for hybrid electric vehicles and no-idling vehicles but also suitably usable for alkaline storage batteries for all-electric vehicles.

REFERENCE SIGNS LIST

1: Positive electrode
2: Negative electrode
3: Separator
4: Casing (battery case)
10: Alkaline storage battery

The invention claimed is:

1. A hydrogen absorbing alloy used for an alkaline storage battery, wherein the hydrogen absorbing alloy is composed mainly of two crystal phases of an $A_5B_{19}$ phase and an $A_2B_7$ phase, and is represented by the following General Formula (A):

$$(La_{1-a-b}Ce_aSm_b)_{1-c}Mg_cNi_dM_eT_f \quad (A),$$

where M, T, and suffixes a, b, c, d, e, and f in Formula (A) meet the following conditions:

M: at least one element selected from Al, Zn, Sn, and Si;

T: at least one element selected from Cr, Mo, and V;

$0 < a \leq 0.10$;
$0 \leq b < 0.15$;
$0.08 \leq c \leq 0.24$;
$0.03 \leq e \leq 0.14$;
$0 \leq f \leq 0.05$; and
$3.55 \leq d + e + f \leq 3.80$.

2. The hydrogen absorbing alloy for an alkaline storage battery according to claim 1, wherein, in General Formula (A), the following conditions are further met: $0.08 \leq c \leq 0.18$ and $3.70 \leq d+e+f \leq 3.80$.

3. The hydrogen absorbing alloy for an alkaline storage battery according to claim 1, wherein, in General Formula (A), the following conditions are further met: M being Al, $0<a\leq 0.08$, $0\leq b\leq 0.08$, $0.14\leq c\leq 0.24$, and $0.03\leq e<0.10$.

4. The hydrogen absorbing alloy for an alkaline storage battery according to claim 1, wherein, in hydrogen absorption-desorption characteristics of the hydrogen absorbing alloy, a hydrogen pressure (P0.5) when a hydrogen absorbing capacity (H/M) during hydrogen desorption at 80° C. is 0.5 is between 0.02 MPa and 0.1 MPa, inclusive, with the hydrogen absorbing capacity (H/M) here being a ratio between the numbers of atoms of hydrogen atoms (H) and metal atoms (M), inclusive.

5. The hydrogen absorbing alloy for an alkaline storage battery according to claim 1, wherein, in hydrogen absorption-desorption characteristics of the hydrogen absorbing alloy, a plateau slope during desorption after absorption of hydrogen is within a range that meets the following Formula (B):

$$0.90 \leq \log[(P0.7/P0.3)/0.4] \leq 3.00 \ldots (B)$$

where P0.7 represents a hydrogen pressure [MPa] when a hydrogen absorbing capacity (H/M)=0.7, and P0.3 represents a hydrogen pressure [MPa] when the hydrogen absorbing capacity (H/M)=0.3.

6. The hydrogen absorbing alloy for an alkaline storage battery according to claim 1, wherein the hydrogen absorbing alloy has a volume mean grain size MV of 75 μm or larger when the hydrogen absorbing alloy with a granularity adjusted to be within a range of 150 μm to 1 mm, both inclusive, has repeatedly absorbed and desorbed hydrogen, and has a hydrogen absorbing capacity (H/M; H is the number of hydrogen atoms, M is the number of metal atoms) of 0.92 or more when a hydrogen pressure is applied up to 1 MPa at 80° C., the volume mean grain size MV here being measured after the following process is repeated five times: for hydrogen absorption, applying a hydrogen pressure up to 3 MPa at 80° C. and holding it thereto for one hour, and for hydrogen desorption, performing vacuum evacuation to reduce the pressure to 0.01 MPa or less at 80° C. and holding it thereto for one hour.

7. The hydrogen absorbing alloy for an alkaline storage battery according to claim 1, wherein the hydrogen absorbing alloy has a saturation magnetization of 60 $emu/m^2$ or less as measured by immersing the hydrogen absorbing alloy in a 7.15 mol/L aqueous potassium hydroxide solution at 80° C. for eight hours and then applying a magnetic field of 10 kOe at 25° C.

8. The hydrogen absorbing alloy for an alkaline storage battery according to claim 1, wherein, in the hydrogen absorbing alloy, a ratio of a sum (β) of diffraction intensities of a (107) plane based on a 2H structure and a (1010) plane based on a 3R structure of the $A_2B_7$ phase to a sum (α) of diffraction intensities of a (109) plane based on a 2H structure and a (1013) plane based on a 3R structure of the $A_5B_{19}$ phase in an X-ray diffraction measurement using a Cu-Ko ray as an X-ray source meets $\beta/\alpha \leq 1$.

9. The hydrogen absorbing alloy for an alkaline storage battery according to claim 1, wherein, in the hydrogen absorbing alloy, a ratio of a diffraction intensity (ζ) of a (101) plane of an $AB_5$ phase to a diffraction intensity (ε) of a strongest diffraction peak in a range of a diffraction angle 2θ of 40 to 45° in an X-ray diffraction measurement using a Cu-Kα ray as an X-ray source meets $\zeta/\varepsilon \leq 0.08$.

* * * * *